United States Patent
Mori et al.

(10) Patent No.: US 8,953,978 B2
(45) Date of Patent: Feb. 10, 2015

(54) IMAGE FORMING APPARATUS

(71) Applicants: Shogo Mori, Nagoya (JP); Takuya Yamaguchi, Toyokawa (JP)

(72) Inventors: Shogo Mori, Nagoya (JP); Takuya Yamaguchi, Toyokawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 115 days.

(21) Appl. No.: 13/623,519

(22) Filed: Sep. 20, 2012

(65) Prior Publication Data
US 2013/0164025 A1 Jun. 27, 2013

(30) Foreign Application Priority Data
Dec. 26, 2011 (JP) ................................. 2011-284420

(51) Int. Cl.
G03G 21/16 (2006.01)
(52) U.S. Cl.
CPC ........ *G03G 21/16* (2013.01); *G03G 2221/1678* (2013.01)
USPC .......................................... 399/107; 399/114
(58) Field of Classification Search
CPC .................................................... G03G 15/00
USPC .................................................. 399/107, 114
See application file for complete search history.

(56) References Cited

U.S. PATENT DOCUMENTS

| | | | | |
|---|---|---|---|---|
| 4,627,701 A * | 12/1986 | Onoda et al. | ................... | 399/170 |
| 4,764,788 A * | 8/1988 | Watashi et al. | ................ | 399/214 |
| 4,803,510 A * | 2/1989 | Maeda | ........................... | 399/114 |
| 4,969,010 A * | 11/1990 | Tamura et al. | ................... | 355/75 |
| 5,041,872 A * | 8/1991 | Nukaya et al. | ................ | 399/107 |
| 5,452,059 A * | 9/1995 | Sekiya | .............................. | 399/25 |
| 7,822,362 B2 * | 10/2010 | Watanabe et al. | ............. | 399/125 |
| 7,826,769 B2 * | 11/2010 | Yamaguchi | .................... | 399/125 |
| 8,010,014 B2 * | 8/2011 | Noguchi | ....................... | 399/111 |
| 8,511,818 B2 * | 8/2013 | Nishikawa | ..................... | 347/108 |
| 2005/0031371 A1 * | 2/2005 | Kaida et al. | .................... | 399/110 |
| 2005/0196217 A1 * | 9/2005 | Nishimura et al. | ........... | 400/693 |
| 2008/0050146 A1 * | 2/2008 | Kita et al. | ...................... | 399/107 |
| 2008/0131164 A1 * | 6/2008 | Ohta et al. | ..................... | 399/125 |
| 2008/0157639 A1 * | 7/2008 | Jeong et al. | ................... | 312/237 |
| 2008/0237429 A1 * | 10/2008 | Lam et al. | ...................... | 248/351 |
| 2009/0010697 A1 * | 1/2009 | Nishimura et al. | ........... | 399/405 |

(Continued)

FOREIGN PATENT DOCUMENTS

| | | | | |
|---|---|---|---|---|
| JP | 06-228536 A | | 8/1994 | |
| JP | 1994-6228536 | * | 8/1994 | ................ B60R 7/06 |

(Continued)

*Primary Examiner* — Clayton E Laballe
*Assistant Examiner* — Kevin Butler
(74) *Attorney, Agent, or Firm* — Banner & Witcoff, Ltd.

(57) ABSTRACT

An image forming apparatus includes: a rotary member which rotates with respect to an apparatus main body between a first position and a second position; and a buffering member connected to the apparatus main body and the rotary member for buffering an impact attributable to the rotation of the rotary member. The buffering member includes: a hollow member; a movable member moveable between an evacuation position and an advance position; and a slide member provided to the movable member and contactable with an inner circumferential surface of the hollow member. The slide member is deformable such that a first pressure on the hollow member when the rotary member rotates from the first position to the second position is larger than a second pressure on the hollow member when the rotary member rotates from the second position to the first position.

22 Claims, 17 Drawing Sheets

(56) References Cited

U.S. PATENT DOCUMENTS

| | | | |
|---|---|---|---|
| 2009/0034208 A1* | 2/2009 | Suzuki | 361/725 |
| 2009/0214258 A1* | 8/2009 | Yamaguchi | 399/125 |
| 2009/0252527 A1* | 10/2009 | Watanabe et al. | 399/111 |
| 2009/0252528 A1* | 10/2009 | Yamaguchi | 399/111 |
| 2010/0080617 A1* | 4/2010 | Noguchi | 399/112 |
| 2011/0158680 A1* | 6/2011 | Koiwai | 399/110 |
| 2011/0262181 A1* | 10/2011 | Noguchi | 399/110 |
| 2011/0309651 A1* | 12/2011 | Hernandez et al. | 296/100.08 |
| 2012/0074821 A1* | 3/2012 | Ishida | 312/223.1 |
| 2012/0085036 A1* | 4/2012 | Nishida et al. | 49/386 |
| 2012/0321344 A1* | 12/2012 | Noguchi | 399/112 |
| 2013/0014443 A1* | 1/2013 | Kim et al. | 49/381 |
| 2013/0164025 A1* | 6/2013 | Mori et al. | 399/107 |

FOREIGN PATENT DOCUMENTS

| | | |
|---|---|---|
| JP | 2009-251230 A | 10/2009 |
| JP | 2011-138038 A | 7/2011 |

* cited by examiner

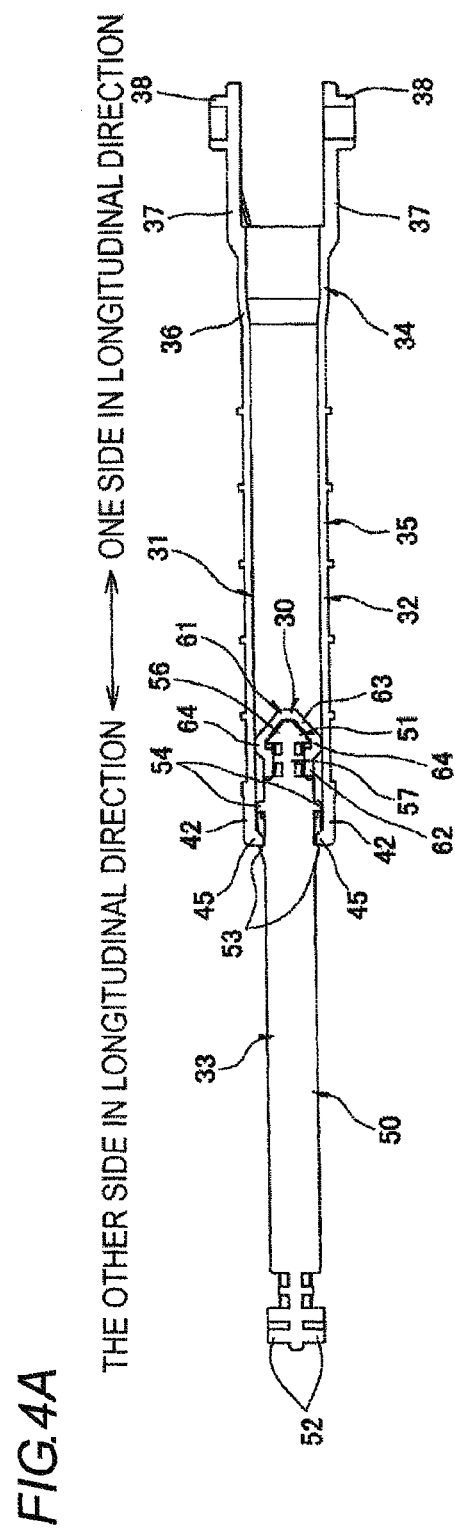

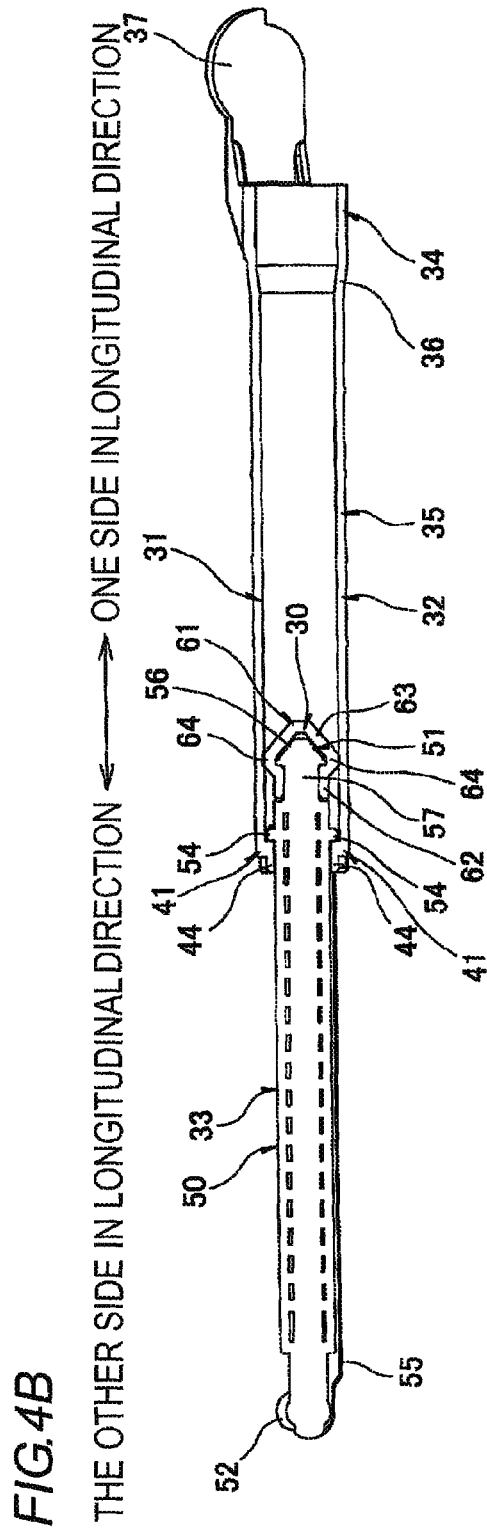

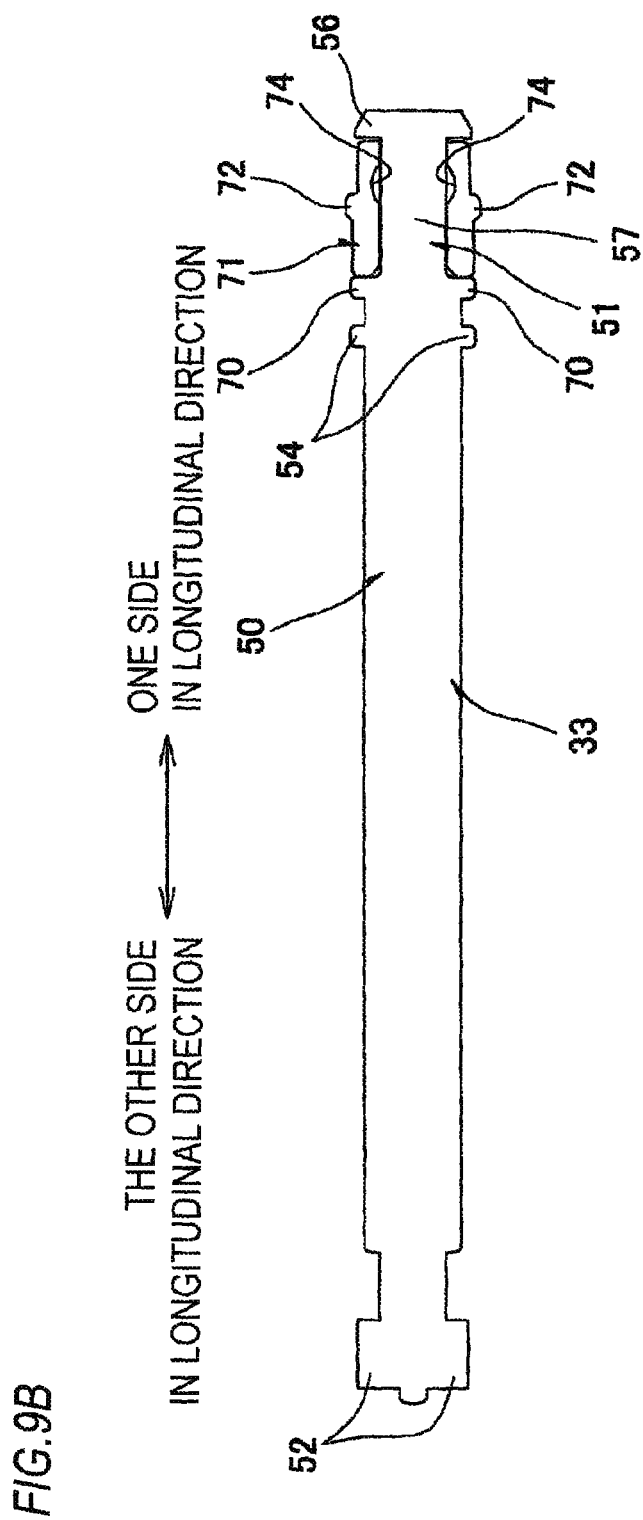

IMAGE FORMING APPARATUS

CROSS-REFERENCE TO RELATED APPLICATIONS

This application claims priority from Japanese Patent Application No. 2011-284420 filed on Dec. 26, 2011, the entire subject matter of which is incorporated herein by reference.

TECHNICAL FIELD

The present invention relates to an image forming apparatus using an electrophotographic system.

BACKGROUND

As electrophotographic image forming apparatuses, there are known printers in which photosensitive members and a developing unit are contained in an apparatus main body, the photosensitive members carry developer images, and the developing unit feeds developers to the photosensitive members.

For example, there is known a printer in which an opening and a supporting member are provided at the top of an apparatus main body, wherein the opening is for maintaining photosensitive members and a developing unit, and wherein the supporting member is for opening and closing the opening.

In this related-art printer, the supporting member closes the opening when the supporting member is placed close to the apparatus main body (an adjacent state), and the supporting member opens the opening when the supporting member is placed away from the apparatus main body (a distant state).

Further, the related-art printer includes an arm that rises with respect to the apparatus main body so as to hold the supporting member in the distant state, and an arm spring that presses the arm so as to raise the arm.

SUMMARY

Illustrative aspects of the present invention provide an image forming apparatus capable of reducing a load on an apparatus main body from a buffering member while buffering an impact attributable to the rotation of a rotary member by the buffering member.

According to a first illustrative aspect of the present invention, there is provided an image forming apparatus comprising: an apparatus main body; a rotary member configured to rotate with respect to the apparatus main body between a first position and a second position that is different from the first position; and a buffering member, which is connected to the apparatus main body and the rotary member, and which is configured to buffer an impact attributable to the rotation of the rotary member. The buffering member comprises: a hollow member connected to any one of the apparatus main body and the rotary member; a movable member, which is connected to any one of the apparatus main body and the rotary member, and which is configured to be move between an evacuation position where the movable member evacuates into the hollow member and an advance position where the movable member advances from the hollow member; and a slide member, which is provided to the movable member, and which is configured to contact an inner circumferential surface of the hollow member. The slide member is configured to be deformed such that a first pressure on the hollow member when the rotary member rotates from the first position to the second position is larger than a second pressure on the hollow member when the rotary member rotates from the second position to the first position.

BRIEF DESCRIPTION OF THE DRAWINGS

FIGS. 4A to 4C are explanatory views for explaining an assembly state of a cylinder and a rod of the damper shown in FIG. 2, in which FIG. 4A is a cross-sectional view illustrating engagement of a stopper of the cylinder and locking claws of the rod, FIG. 4B is a cross-sectional view illustrating engagement of a retaining protrusion of the cylinder and a brim portion of the rod, and FIG. 4C is a side view illustrating engagement of rail fitting grooves of the cylinder and rails of the rod as seen from the other side in the longitudinal direction;

FIGS. 8A to 8C are explanatory views for explaining a deformation of the slide member in the opening/closing operation of the top cover, in which FIG. 8A shows a state where the top cover is at the closed position and the slide member has not been deformed, FIG. 8B shows a state where the slide member has been deformed in the opening operation of the top cover such that a protruding portion evacuates into a gap, and FIG. 8C shows a state where the slide member has been deformed in the closing operation of the top cover such that the protruding portion is pressed against the inner circumferential surface of the cylinder;

FIGS. 9A and 9B are explanatory views for explaining first and second modification examples of the damper, respectively;

DETAILED DESCRIPTION

<General Overview>

Figure 1:
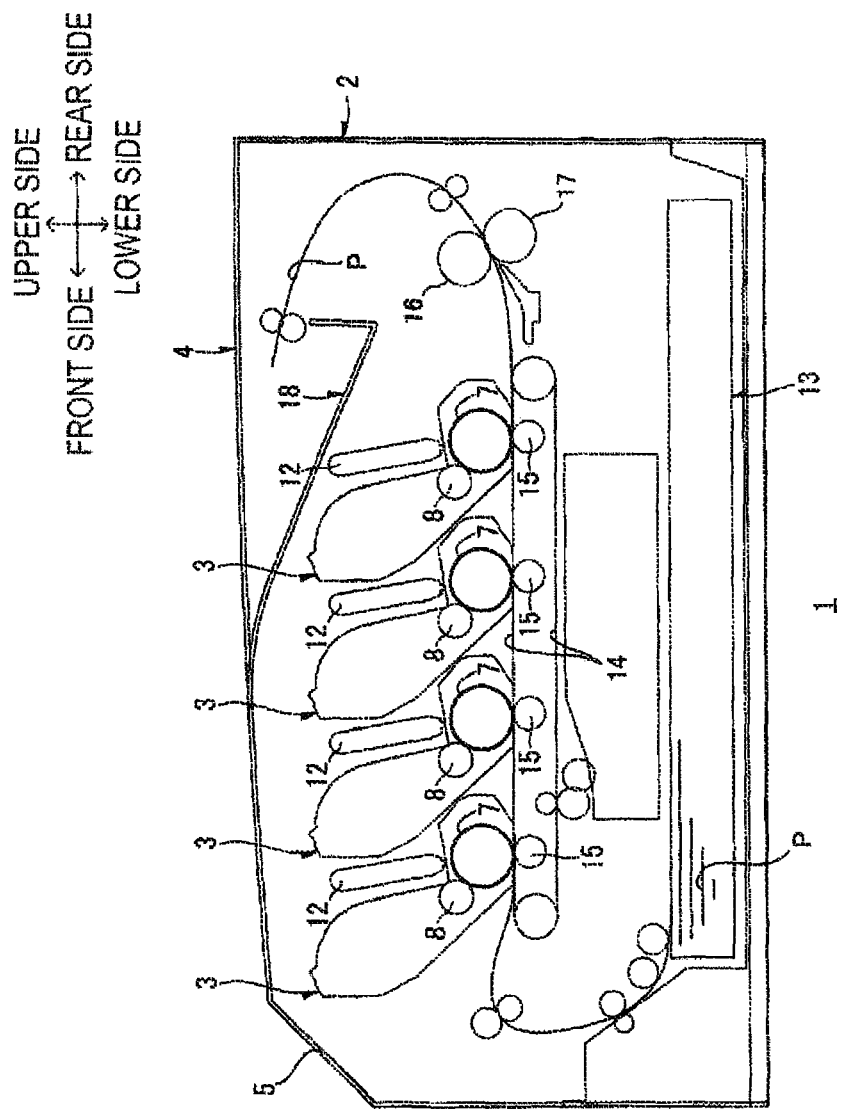
FIG. 1 is a view illustrating the center section of a printer according to an exemplary embodiment of an image forming apparatus of the present invention.

However, in the above-described related-art printer, when the supporting member is placed in the adjacent state, the arm is tilted against the pressing force of the arm spring.

For this reason, in the state where the supporting member is placed in the adjacent state, the pressing force of the arm spring continuously acts on a spring locking portion locking the arm spring.

As a result, due to the pressing force of the arm spring, the spring locking portion may be deformed (creep) with time.

Therefore, illustrative aspects of the present invention provide an image forming apparatus capable of reducing a load on an apparatus main body from a buffering member while buffering an impact attributable to the rotation of a rotary member by the buffering member.

According to a first illustrative aspect of the present invention, there is provided an image forming apparatus comprising: an apparatus main body; a rotary member configured to rotate with respect to the apparatus main body between a first position and a second position that is different from the first position; and a buffering member, which is connected to the apparatus main body and the rotary member, and which is configured to buffer an impact attributable to the rotation of the rotary member. The buffering member comprises: a hollow member connected to any one of the apparatus main body and the rotary member; a movable member, which is connected to any one of the apparatus main body and the rotary member, and which is configured to be move between an evacuation position where the movable member evacuates into the hollow member and an advance position where the movable member advances from the hollow member; and a slide member, which is provided to the movable member, and which is configured to contact an inner circumferential surface of the hollow member. The slide member is configured to be deformed such that a first pressure on the hollow member when the rotary member rotates from the first position to the second position is larger than a second pressure on the hollow member when the rotary member rotates from the second position to the first position.

According thereto, when the rotary member rotates from the first position to the second position, it is possible to press the slide member against the hollow member.

Therefore, when the rotary member rotates from the first position to the second position, it is possible to certainly increase the frictional force between the slide member and the hollow member.

As a result, when the rotary member rotates from the first position to the second position, it is possible to use the frictional force between the slide member and the hollow member to brake the rotation of the rotary member and buffer an impact attributable to the rotation of the rotary member.

Also, when the rotary member is placed at the first position or the second position and does not rotate, since a frictional force is not generated between the slide member and the hollow member, it is possible to reduce a force on the apparatus main body from the buffering member.

As a result, it is possible to reduce the load on the apparatus main body from the buffering member while buffering an impact attributable to the rotation of the rotary member by the buffering member.

According to a second illustrative aspect of the present invention, the slide member is configured to be elastically deformed by friction with the inner circumferential surface of the hollow member.

According thereto, it is possible to use the friction with the inner circumferential surface of the hollow member to deform the slide member.

Therefore, it is unnecessary to separately provide a member for deforming the slide member, and it is possible to deform the slide member with the simple configuration.

According to a third illustrative aspect of the present invention, in a vertical direction, the position of a rotation end portion of the rotary member at the second position is lower than the position of the rotation end portion of the rotary member at the first position.

According to this configuration, when the rotary member rotates such that the rotation end portion heads to the lower side in the vertical direction, it is possible to brake the rotation of the rotary member.

According to a fourth illustrative aspect of the present invention, the movable member is disposed at the advance position when the rotary member is disposed at the first position. The movable member is disposed at the evacuation position when the rotary member is disposed at the second position.

According thereto, when the rotary member moves from the first position to the second position, it is possible to evacuate the movable member into the hollow member. Also, when the rotary member moves from the second position to the first position, it is possible to advance the movable member from the hollow member.

Therefore, the rotary member can be positioned at the first position so as to be distant from the apparatus main body, and can be positioned at the second position so as to be adjacent to the apparatus main body.

According to a fifth illustrative aspect of the present invention, the slide member comprises: a covering portion configured to cover the movable member to form a gap from the movable member; and a protruding portion, which protrudes from the covering portion toward the inner circumferential surface of the hollow member, and which is configured to contact the inner circumferential surface of the hollow member. The slide member is configured to be deformed such that the protruding portion moves into the gap when the rotary member rotates from the second position to the first position.

According thereto, when the rotary member rotates from the second position to the first position, it is possible to evacuate the protruding portion from the inner circumferential surface of the hollow member into the gap.

Therefore, when the rotary member rotates from the second position to the first position, it is possible to reduce the frictional force between the slide member and the hollow member.

As a result, it is possible to easily rotate the rotary member from the second position to the first position.

According to a sixth illustrative aspect of the present invention, the gap is formed upstream of the protruding portion in the movement direction of the movable member when the rotary member rotates from the second position to the first position.

According thereto, it is possible to use the friction with the inner circumferential surface of the hollow member, attributable to the rotation of the rotary member from the second position to the first position, to move the protruding portion toward the gap.

Therefore, when the rotary member rotates from the second position to the first position, it is possible to certainly reduce the frictional force between the slide member and the hollow member with the simple configuration.

According to a seventh illustrative aspect of the present invention, a first end portion of the movable member is connected to any one of the apparatus main body and the rotary member, and a second end portion of the movable member is disposed in the hollow member. The slide member comprises an end-portion covering portion configured to cover the second end portion of the movable member.

According thereto, it is possible to cover the end portion of the movable member on the downstream side in the evacuation direction of the movable member into the hollow member, with the end-portion covering portion.

Therefore, when the movable member evacuates into the hollow member, it is possible to use the end-portion covering portion to prevent the slide member from shifting toward the upstream side in the evacuation direction of the movable member into the hollow member.

According to an eighth illustrative aspect of the present invention, the gap is formed between the end-portion covering portion and the movable member.

According thereto, when the movable member evacuates into the hollow member, it is possible to deform the slide member such that the end-portion covering portion is positioned close to the movable member, with a simple configuration.

According to a ninth illustrative aspect of the present invention, the slide member covers the movable member such that the slide member is contactable with the movable member. The movable member comprises a first recess formed to be separated from the slide member. The gap is formed between the slide member and the first recess.

According thereto, it is possible to use the first recess of the movable member to deform the slide member with the simple configuration.

According to a tenth illustrative aspect of the present invention, the slide member covers the movable member such that the slide member is contactable with the movable member. The slide member comprises a second recess formed to be separated from the movable member. The gap is formed between the movable member and the second recess.

According thereto this configuration, it is possible to use the second recess of the slide member to deform the slide member with the simple configuration.

According to an eleventh illustrative aspect of the present invention, the movable member comprises a regulating portion that protrudes toward the hollow member so as to regulate the movement of the slide member in the movement direction of the movable member.

According thereto, it is possible to use the regulating portion to prevent the slide member from shifting according to the movement of the movable member.

According to a twelfth illustrative aspect of the present invention, the movable member comprises a first engagement portion. The hollow member comprises a first engagement subject portion configured to be engaged with the first engagement portion so as to regulate the movement of the movable member from the advance position to the evacuation position when the movable member is disposed at the evacuation position.

According thereto, it is possible to use engagement of the first engagement portion and the first engagement subject portion to hold the movable member at the advance position.

According to a thirteenth illustrative aspect of the present invention, the movable member comprises a second engagement portion. The hollow member comprises a second engagement subject portion configured to be engaged with the second engagement portion so as to regulate the further movement of the movable member in an advance direction when the movable member is disposed at the advance position.

According thereto, it is possible to use engagement of the second engagement portion and the second engagement subject portion to prevent the movable member from deviating in the advance direction from the hollow member.

According to a fourteenth illustrative aspect of the present invention, the movable member comprises a third engagement portion. The hollow member comprises a third engagement subject portion configured to be engaged with the third engagement portion so as to regulate the rotation of the movable member relative to the hollow member in a direction perpendicular to the movement direction of the movable member.

According thereto, it is possible to use engagement of the third engagement portion and the third engagement subject portion to prevent the movable member from rotating with respect to the hollow member.

According to a fifteenth illustrative aspect of the present invention, the hollow member comprises: a first portion configured to receive the slide member with a play when the movable member is disposed at the evacuation position; and a second portion, which is configured to contact the slide member when the movable member advances, and which is narrower than the first portion in an orthogonal direction perpendicular to the advance direction of the movable member. The apparatus main body comprises a positioning portion configured to position the rotary member at the second position. The slide member is configured to be received by the first portion before the rotary member is disposed at the second position.

According thereto, before the rotary member is placed at the second position, it is possible to release the friction of the movable member with the hollow member.

Therefore, when the rotary member is at the position, it is possible to reduce the force on the apparatus main body from the buffering member.

According to a sixteenth illustrative aspect of the present invention, the hollow member comprises a connecting portion, which is inclined to narrow in the orthogonal direction as from the upstream side to a downstream side in the advance direction of the movable member, and which connects an end portion of the first portion on the downstream side in the advance direction and an end portion of the second portion on the upstream side in the advance direction.

According thereto, when the movable member advances from the hollow member, it is possible to gradually deform the slide member according to the inclination of the connecting portion.

Therefore, it is possible to smoothly deform the slide member.

According to a seventeenth illustrative aspect of the present invention, the hollow member comprises a connecting portion that extends from an end portion of the first portion on the downstream side in the advance direction toward an end portion of the second portion on the upstream side in the advance direction, along the orthogonal direction.

According thereto, when the movable member advances from the hollow member, it is possible to deform the slide member at the timing when the slide member passes through the connecting portion.

Therefore, it is possible to quickly deform the slide member.

According to an eighteenth illustrative aspect of the present invention, the apparatus main body comprises an opening configured to communicate between an inside and outside of the apparatus main body. The rotary member is configured to: open the opening when the rotary member is at the first position; and close the opening when the rotary member is at the second position.

According thereto, when the opening is closed by the rotary member, it is possible to buffer an impact attributable to the rotation of the rotary member.

According to a nineteenth illustrative aspect of the present invention, the image forming apparatus further comprises: a photosensitive member configured to be provided in the apparatus main body; and an exposing member, which is disposed to face the photosensitive member, and which is configured to expose the photosensitive member. The exposing member is supported by the rotary member.

According thereto, in a configuration in which the weight of the rotary member increases by the exposing member, it is possible to buffer an impact attributable to the rotation of the rotary member.

According to a twentieth illustrative aspect of the invention, the movable member further comprises: a second engagement portion; and a third engagement portion. The hollow member further comprises: a second engagement subject portion configured to be engaged with the second engagement portion so as to regulate the further movement of the movable member in an advance direction when the movable member is disposed at the advance position, and a third engagement subject portion configured to be engaged with the third engagement portion so as to regulate the rotation of the movable member relative to the hollow member in a direction perpendicular to the movement direction of the movable member.

According to a twenty-first illustrative aspect of the invention, the buffering member comprises a holding member configured to hold the slide member to the movable member. The movable member has a substantially cylindrical shape extending in the movement direction of the movable member. The slide member is configured to cover an outer circumferential surface of the movable member. The holding member is configured to sandwich at least a part of the slide member between the holding member and the outer circumference of the movable member so as to hold the slide member to the movable member.

According to a twenty-second illustrative aspect of the invention, there is provided an image forming apparatus comprising: an apparatus main body; a cover configured to rotate with respect to the apparatus main body between a first position and a second position that is different from the first position; and a damper connected to the apparatus main body and the cover. The damper comprises: a cylinder connected to the apparatus main body; a rod configured to move between: an evacuation position where the cover evacuates into the cylinder when the cover is disposed at the second position; and an advance position where the cover advances from the cylinder when the cover rotates from the second position to the first position; and a slide member comprising a protruding portion protruding toward the cylinder, wherein the slide member is configured to cover an outer circumferential surface of the rod and is configured to contact an inner circumferential surface of the cylinder. The slide member is configured to form a gap from the rod at a downstream side of the protruding portion in a movement direction of the rod when the cover rotates from the first position to the second position.

According to the image forming apparatus of the present invention, it is possible to suppress the load of the buffering member on the apparatus main body while buffering an impact attributable to the rotation of the rotary member by the buffering member.

Exemplary Embodiments

Exemplary embodiments of the present invention will now be described with reference to the Drawings.
1. Overall Configuration of Printer A printer 1 is one example of an image forming apparatus, and is a transverse mounted direct tandem type color printer as shown in FIG. 1.

In the following description, in cases where directions are referred to, on the basis of a state where the printer 1 is mounted horizontally, the left side of the plane of paper of FIG. 1 is referred to as the front side, and the right side of the plane of paper of FIG. 1 is referred to as the rear side. Also, the left side and the right side are defined on the basis of directions when the printer 1 is viewed from the front side. In other words, the front side of the plane of paper of FIG. 1 is the right side, and the rear side of the plane of paper is the left side.

The printer 1 includes a main body casing 2 (one example of an apparatus main body) having a substantially box shape. At the upper end portion of the main body casing 2, a main body opening 5 is formed to connect the inside and outside of the main body casing 2. Also, at the upper end portion of the main body casing 2, a top cover 4 (one example of a rotary member) is provided.

The top cover 4 is rotatable on a rear end portion thereof between an open position (one example of a first position) where the top cover 4 opens the main body opening 5 (see FIG. 7) and a closed position (one example of a second position) where the top cover 4 closes the main body opening 5. In other words, the position of the front end portion of the top cover 4 (one example of a rotation end portion) is configured such that, the front end portion of the top cover 4 when the top cover 4 is at the closed position is lower than the position of the front end portion of the top cover 4 when the top cover 4 is at the open position.

Further, the printer 1 includes a plurality of (e.g., four) process cartridges 3, which are aligned in parallel with intervals in the front/rear direction, and the LED units 12 (one example of an exposing member) inside the main body casing 2.

The process cartridges 3 are configured to be mountable into and removable from the main body casing 2 in a state where the top cover 4 is at the open position. Each process cartridge 3 includes a photosensitive drum 7 (one example of a photosensitive member) and a developing roller 8.

The photosensitive drum 7 is formed in a cylindrical shape long in the left/right direction. The photosensitive drum 7 is mounted to be rotatable on a central axis line thereof.

The developing roller 8 extends in the left/right direction. The developing roller 8 comes from the top front side into contact with the photosensitive drum 7.

In each process cartridge 3, toner (one example of developer) is contained in the upper side of the developing roller 8.

Figure 2:
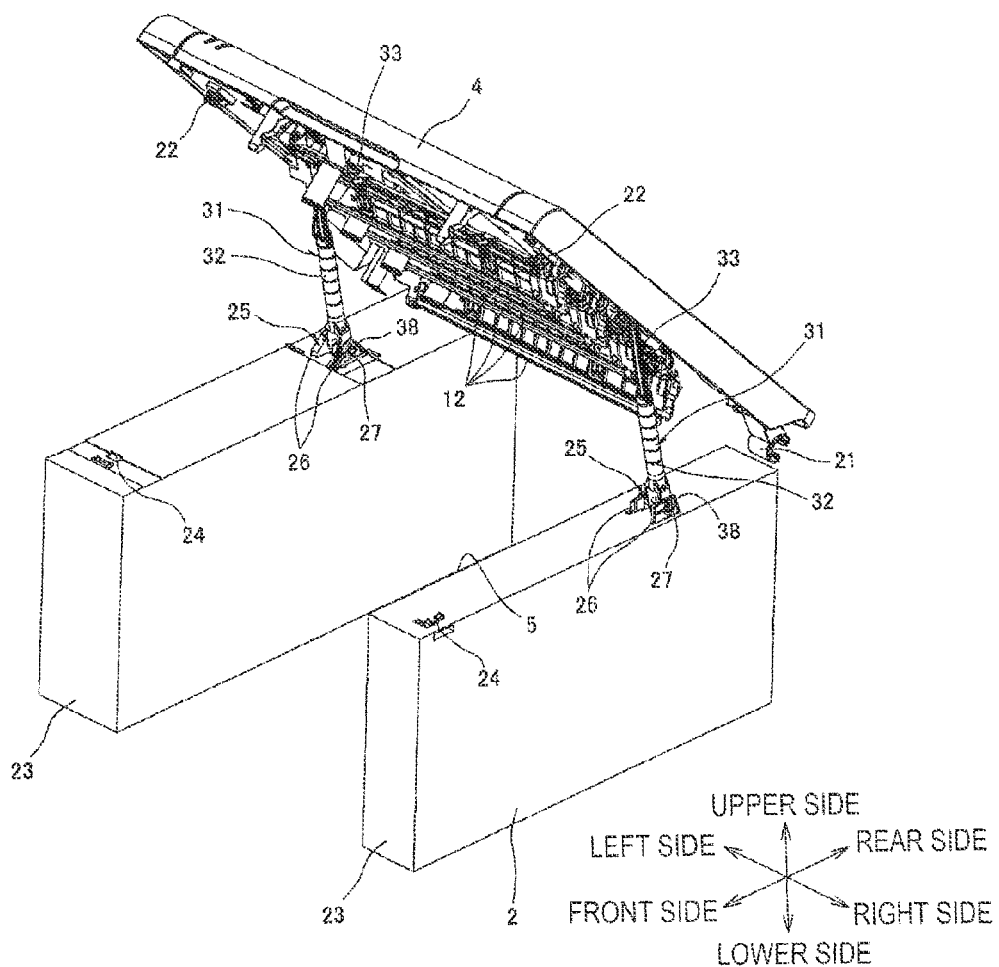
FIG. 2 is a perspective view of a top cover of the printer of FIG. 1 as seen from the top right side.

The LED units 12 are supported on the lower surface of the top cover 4 so as to face the tops of the photosensitive drums 7 (see FIG. 2).

The toner in the process cartridges 3 is triboelectrically charged to have positive polarity, and is carried as thin layers of a constant thickness on the surfaces of the developing rollers 8.

Meanwhile, the surfaces of the photosensitive drums 7 are uniformly charged by chargers (not shown), and then are exposed on a basis of predetermined image data by the LED units 12. As a result, on the surfaces of the photosensitive drums 7, electrostatic latent images based on the image data are formed. Next, the toner carried on the developing rollers 8 is fed to the electrostatic latent images on the surfaces of the photosensitive drums 7, such that toner images (developer images) are carried on the surfaces of the photosensitive drums 7.

Sheets P are contained in a paper feed tray 13, which is provided at the bottom of the main body casing 2. The sheets P contained in the paper feed tray 13 are conveyed to make a U turn toward the top rear side by various rollers, and are fed between the photosensitive drums 7 and a conveyance belt 14, one at a time at a predetermined timings. Next, each sheet P is conveyed from the front side toward the rear side 7 by the conveyance belt 14 such that the sheet P sequentially faces all of the photosensitive drums. At this time, the toner images carried on the photosensitive drums 7 are transferred onto the sheet P by transfer biases of transfer rollers 15 disposed below the photosensitive drums 7 to face the photosensitive drums 7 with the conveyance belt 14 interposed therebetween.

Then, the sheet P passes through between a heating roller 16 and a pressing roller 17 so as to be heated and pressed. As a result, the toner image is thermally fixed to the sheet P.

Thereafter, the sheet P is conveyed to make a U turn toward the top front side, and is discharged onto a discharge tray 18 provided at the top of the main body casing 2.

2. Top Cover

As shown in FIG. 2, the top cover 4 is formed in a substantially rectangular plate shape extending back and forth and left and right and having a thickness in the vertical direction as seen in a plan view. The top cover 4 includes a pair of left and right rotary portions 21 and a pair of left and right fit protrusions 22.

The rotary portions 21 are provided to both end portions of the rear end portion of the top cover 4 in the left/right direction, one by one. The rotary portions 21 are formed in a substantially C shape with an open rear side. The rotary portions 21 are rotatably fit on rotary shafts (not shown) provided at the rear end portion of the main body casing 2.

The fit protrusions 22 are provided to both end portions of the front end portion of the top cover 4 in the left/right direction, one by one. The fit protrusions 22 are formed in a substantially prismatic shape protruding downward from the bottom of the top cover 4.

3. Main Body Casing

The main body casing 2 includes a pair of side walls 23 disposed to face each other with a gap in the left/right direction. At each of the side walls 23 of the main body casing 2, there are provided a fitting recess 24 (one example of a positioning portion) and a supporting portion 25 for supporting a damper 31 (to be described below).

The fitting recesses 24 are provided to the front end portions of the side walls 23. The fitting recesses 24 are formed in a substantially rectangular shape extending downward from the tops of the side walls 23 and capable of accommodating the fit protrusions 22 of the top cover 4 as seen in a plan view.

The supporting portions 25 are provided on the rear sides of the side walls 23. Each of the supporting portions 25 includes a pair of supporting side plates 26 disposed to face each other with a gap in the left/right direction.

The supporting side plates 26 are formed in a substantially plate shape extending upward from the tops of the side walls 23 of the main body casing 2. At the supporting side plates 26, fitting holes 27 are formed in a substantially circular shape as seen in the side view, and allow supporting bosses 38 (to be described below) of the dampers 31 (to be described below) to be fit thereto.

4. Damper

Between the top cover 4 and the main body casing 2, there are provided the dampers 31 (one example of a buffering member).

Figure 3:
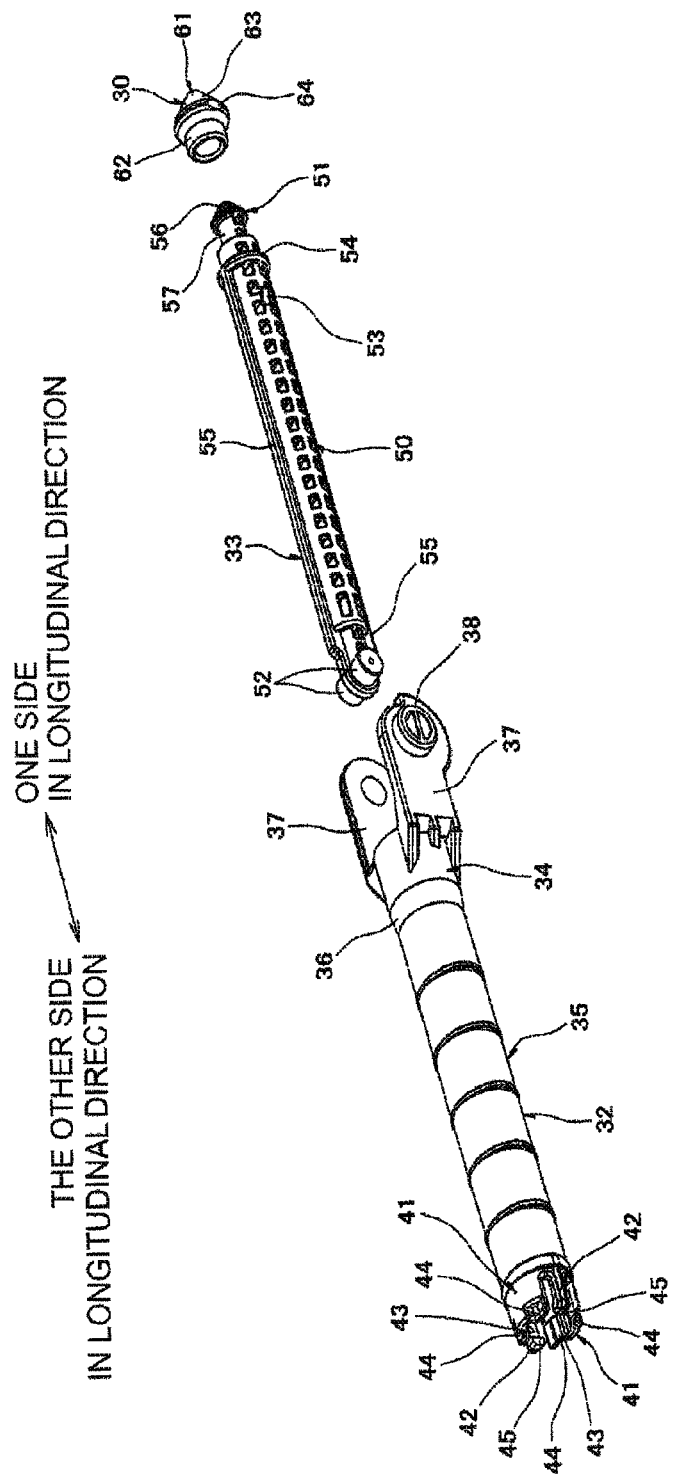
FIG. 3 is an exploded perspective view illustrating a damper shown in FIG. 2.

As shown in FIGS. 3 and 4, each damper 31 includes a cylinder 32 (one example of a hollow member), a rod 33 (one example of a movable member), and a slide member 30.

(1) Cylinder

The cylinder 32 is formed in a substantially hollow cylinder shape extending in the longitudinal direction. The cylinder 32 integrally includes a large-diameter end portion 34 (one example of a first portion), a main cylinder body 35 (one example of a second portion), and a connecting portion 36 that connects the large-diameter end portion 34 and the main cylinder body 35. In the following description, the longitudinal direction of the cylinder 32 is referred to simply as the longitudinal direction. Also, the left side of the plane of paper of FIG. 3 is referred to as one side in the longitudinal direction, and the right side of the plane of paper of FIG. 3 is referred to as the other side in the longitudinal direction. Further, the radial direction of the cylinder 32 is referred to simply as the radial direction.

The large-diameter end portion 34 is provided to the end portion of the cylinder 32 on the one side in the longitudinal direction. The large-diameter end portion 34 is formed to have a diameter relatively larger than that of the main cylinder body 35. The large-diameter end portion 34 includes a pair of connecting portions 37.

The paired connecting portions 37 are disposed on both sides of the large-diameter end portion 34 in the radial direction, respectively, so as to face each other. The connecting portions 37 are formed in a substantially plate shape bulging out in the radial direction of the large-diameter end portion 34 and protruding from the end portion of the large-diameter end portion 34 on the one side in the longitudinal direction, toward the one side in the longitudinal direction. The connecting portions 37 include the supporting bosses 38.

The supporting bosses 38 are formed in a substantially cylindrical shape extending from the outer surfaces of the connecting portions 37 in the radial direction, outward in the radial direction. The supporting bosses 38 respectively provided to the paired connecting portions 37 are disposed to share a central axis line.

The main cylinder body 35 is a portion other than the large-diameter end portion 34 and the connecting portion 36. The main cylinder body 35 is formed to have a diameter relatively smaller than that of the large-diameter end portion 34. The main cylinder body 35 includes two retaining portions 41 and two stoppers 42 (one example of a first engagement subject portion).

The two retaining portions 41 are disposed at the end portion of the main cylinder body 35 on the other side in the longitudinal direction so as to face each other with a gap in the radial direction perpendicular to the facing direction of the connecting portions 37. The retaining portions 41 are formed in a substantially cylindrical shape protruding from the end portion of the main cylinder body 35 on the other side in the longitudinal direction, toward the other side in the longitudinal direction. Each of the two retaining portions 41 includes two retaining protrusions 44 (one example of a second engagement subject portion).

The two retaining protrusions 44 are disposed at both end portions of the corresponding retaining portion 41 in the circumferential direction, respectively, such that the retaining protrusions 44 are parallel with each other with a gap in the circumferential direction of the corresponding retaining portion 41. The retaining protrusions 44 are formed in a substantially convex shape to bulge from the inner surfaces of the retaining portion 41 inward in the radial direction.

The two stoppers 42 are provided between the two retaining portion 41 to face each other in the radial direction. The stoppers 42 are formed in a substantially rod shape extending from the end portion of the cylinder 32 on the other side in the longitudinal direction toward the other side in the longitudinal direction. The stoppers 42 include locking portions 45.

The locking portions 45 are formed in a substantially prismatic shape bulging from the end portions of the stoppers 42 on the other side in the longitudinal direction inward in the radial direction. The surfaces of the locking portions 45 on the one side in the longitudinal direction are inclined to head to the inner side in the radial direction as from the one side to the other side in the longitudinal direction.

The connecting portion 36 is disposed between the large-diameter end portion 34 and the main cylinder body 35. The connecting portion 36 is contiguous to the end portion of the large-diameter end portion 34 on the other side in the longitudinal direction, narrows as from the one side to the other side in the longitudinal direction, and is contiguous to the end portion of the main cylinder body 35 on the one side in the longitudinal direction.

(2) Rod

The rod 33 is formed in a substantially cylindrical shape extending in the longitudinal direction. The length of the rod 33 in the longitudinal direction is substantially the same as the length of the cylinder 32 in the longitudinal direction. The rod 33 integrally includes a rod main body 50 and a slide-member supporting portion 51.

The rod main body 50 is formed in a substantially cylindrical shape extending in the longitudinal direction. The outside diameter of the rod main body 50 is smaller than the inside diameter of the cylinder 32. The rod main body 50 integrally includes a pair of rotary shafts 52, a brim portion 54 (one example of a second engagement portion), a pair of locking claws 53 (one example of a first engagement portion), and a pair of rails 55 (one example of a third engagement portion).

The paired rotary shafts 52 are formed in a substantially cylindrical shape extending from the outer circumferential surface of the end portion of the rod main body 50 on the other side in the longitudinal direction toward the outer side in the radial direction, so as to share a central axis line. The rotary shafts 52 are formed to have protruding lengths to pass between the two locking portions 45 of the cylinder 32.

The brim portion 54 is formed as a ridge protruding from the outer circumferential surface of the end portion of the rod main body 50 on the one side in the longitudinal direction toward the outer side in the radial direction, and extending in the circumferential direction of the rod main body 50. The outside diameter of the brim portion 54 is slightly smaller than the inside diameter of the main cylinder body of the cylinder 32.

The paired locking claws 53 are provided on the other side in the longitudinal direction relative to the brim portion 54, with a gap. The paired locking claws 53 protrude from the outer circumferential surface of the rod main body 50 toward the outer side in the radial direction along the axis line direction of the rotary shafts 52. The protruding lengths of the locking claws 53 are substantially the same as the protruding length of the brim portion 54.

The locking claws 53 are formed in a substantially triangular shape having an apex heading to the outer side in the radial direction. The surfaces of the locking claws 53 on the one side in the longitudinal direction are inclined toward the outer side in the radial direction as from the one side to the other side in the longitudinal direction. The surfaces of the locking claws 53 on the other side in the longitudinal direction are inclined toward the outer side in the radial direction as from the other side to the one side in the longitudinal direction.

The paired rails 55 are formed as ridges protruding from the outer circumferential surface of the rod main body 50 toward the outer side in the radial direction along a direction perpendicular to the axis line direction of the rotary shafts 52 and extending in the longitudinal direction. The protruding lengths of the rails 55 are substantially the same as the protruding length of the brim portion 54.

The slide-member supporting portion 51 includes a base end portion 57 having a substantially cylindrical shape and a front end portion 56 having a substantially conical shape.

The base end portion 57 of the slide-member supporting portion 51 is formed in a substantially cylindrical shape contiguous to the end portion of the rod main body 50 on the one in the longitudinal direction and extending toward the one side in the longitudinal direction, so as to share a central axis line with the rod main body 50. The outside diameter of the base end portion 57 is smaller than the outside diameter of the rod 33.

The front end portion 56 of the slide-member supporting portion 51 is formed in a substantially conical shape contiguous to the end portion of the base end portion 57 on the one side in the longitudinal direction, extending toward the one side in the longitudinal direction, and having an apex heading to the one side in the longitudinal direction, so as to share the central axis line with the rod main body 50. The diameter of the front end portion 56 is substantially the same as the outside diameter of the rod main body 50. In other words, the portion of the front end portion 56 on the other side in the longitudinal direction protrudes outward in the radial direction from the base end portion 57.

(3) Slide Member

Figure 8A:
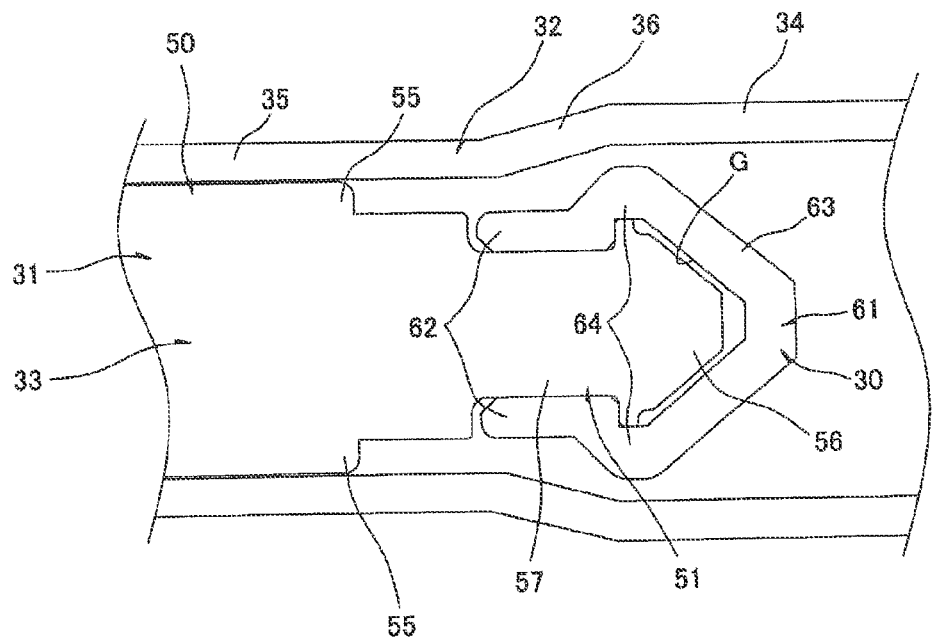

The slide member 30 is made of an elastically deformable material such as rubber. As shown in FIGS. 3 and 8A, the slide member 30 integrally includes a buffering portion 61 (one example of an end-portion covering portion) that covers the front end portion 56 of the slide-member supporting portion 51 of the rod 33, and a fitting portion 62 that covers the base end portion 57 of the slide-member supporting portion 51.

The buffering portion 61 is formed in a substantially hollow and conical shape having an apex heading to the one side in the longitudinal direction. The outside diameter of the end portion of the buffering portion 61 on the other side in the longitudinal direction is slightly larger than the inside diameter of the main cylinder body 35 of the cylinder 32. The inside diameter of the end portion of the buffering portion 61 on the other side in the longitudinal direction is the same as the outside diameter of the end portion of the front end portion 56 of the slide-member supporting portion 51 on the other side in the longitudinal direction. The length of the internal space of the buffering portion 61 in the longitudinal direction is larger than the length of the front end portion 56 of the slide-member supporting portion 51 in the longitudinal direction.

The fitting portion 62 is formed in a substantially cylindrical shape contiguous to the end portion of the buffering portion 61 on the other side in the longitudinal direction, narrows in the radial direction, and extending toward the other side in the longitudinal direction. The inside diameter of the fitting portion 62 is the same as the outside diameter of the base end portion 57. The outside diameter of the fitting portion 62 is the same as the outside diameter of the rod main body 50.

Further, the slide member 30 is covered with the slide-member supporting portion 51 such that the fitting portion 62 covers the base end portion 57 of the slide-member supporting portion 51 and the buffering portion 61 covers the front end portion 56 of the slide-member supporting portion 51 of the rod 33.

In this case, the fitting portion 62 is disposed between the end portion of the rod main body 50 on the one side in the longitudinal direction and the end portion of the front end portion 56 of the slide-member supporting portion 51 on the other side in the longitudinal direction. In other words, the end portion of the rod main body 50 on the one side in the longitudinal direction and the end portion of the front end portion 56 of the slide-member supporting portion 51 on the other side in the longitudinal direction act as a regulating portion for regulating the movement of the slide member 30 in the longitudinal direction.

The inner circumferential surface of the buffering portion 61 on the one side in the longitudinal direction faces the outer circumferential surface of the front end portion 56 of the slide-member supporting portion 51 on the one side in the longitudinal direction, with a gap. In other words, the end portion of the buffering portion 61 on the one side in the longitudinal direction acts as a covering portion 63 for covering the rod 33 so as to form a gap G from the rod 33. The gap G is formed on the one side in the longitudinal direction at the end portion of the buffering portion 61 on the other side in the longitudinal direction.

(4) Description of Assembly State of Damper

As shown in FIGS. 4A and 4B, the rod 33 covered with the slide member 30 is slidably inserted into the cylinder 32 such that the end portion of the rod 33 on the one side in the longitudinal direction is disposed inside the cylinder 32 and the end portion of the rod 33 on the other side in the longitudinal direction is exposed from the end portion of the cylinder 32 on the other side in the longitudinal direction.

Figure 4C:
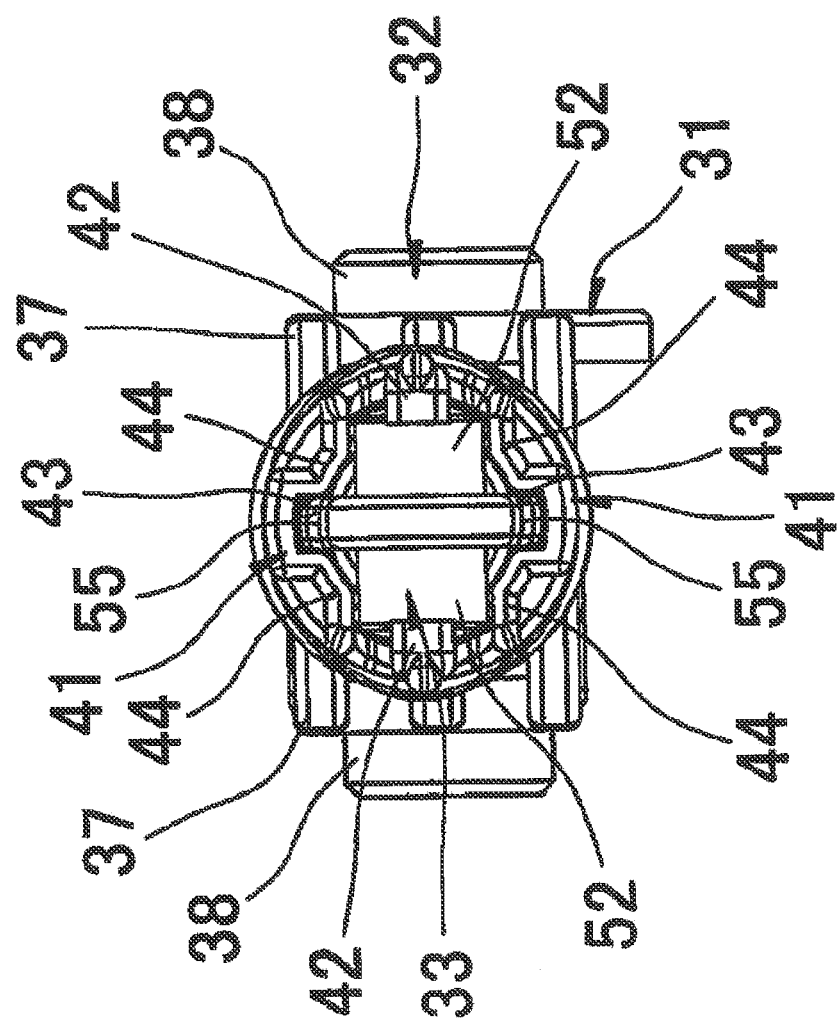

As shown in FIG. 4C, the rails 55 of the rod 33 are fit between the two retaining protrusions 44 of the retaining portion 41 of the cylinder 32. Therefore, the rotation of the rod 33 relative to the cylinder 32 is regulated. In other words, gaps between the two retaining protrusions 44 of the retaining portion 41 of the cylinder 32 act as rail fitting grooves 43 (one example of a third engagement subject portion).

Figure 7:
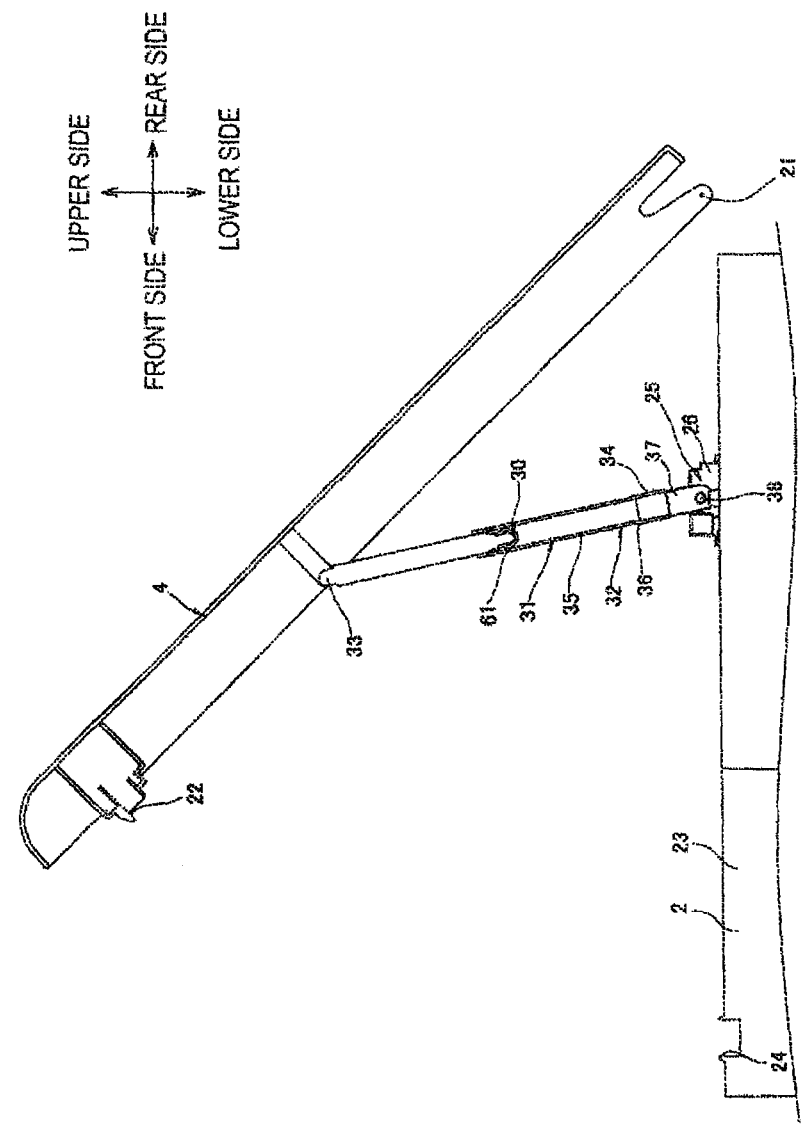
FIG. 7 is an explanatory view for explaining the opening/closing operation of the top cover shown in FIG. 2, and shows a state where the top cover is at an open position.

The rod 33 advances and evacuates between an evacuation position where the rod 33 evacuates into the cylinder 32 (see FIG. 5) and an advance position where the rod 33 advances from the cylinder 32 toward the other side in the longitudinal direction (see FIG. 7).

Figure 5:
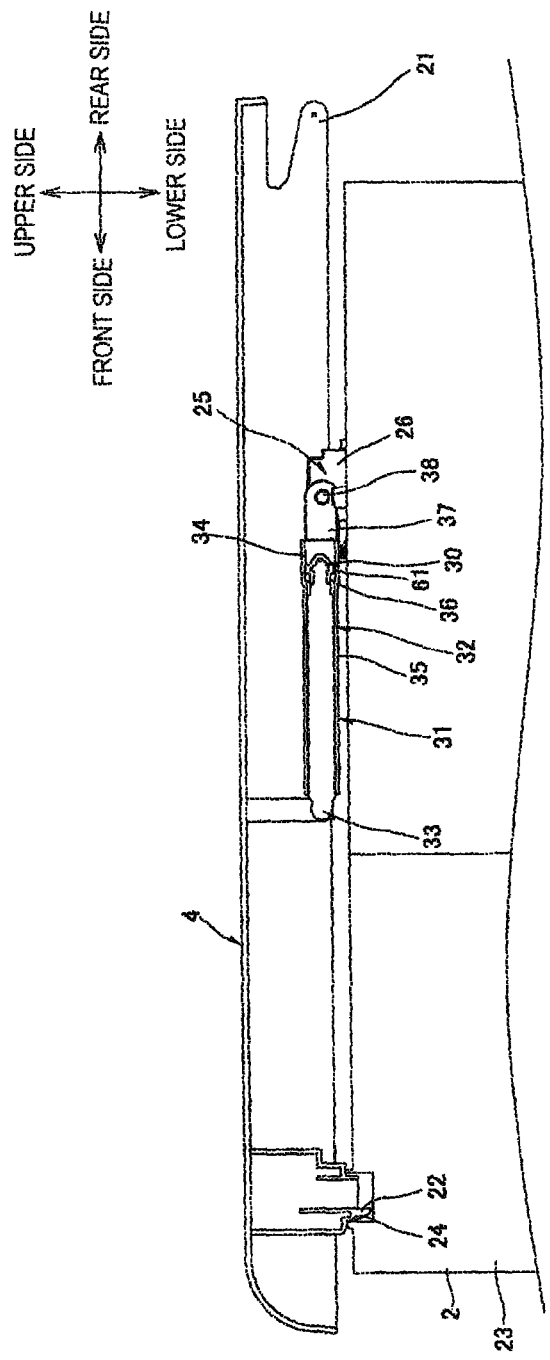
FIG. 5 is an explanatory view for explaining the opening/closing operation of a top cover shown in FIG. 2, and shows a state where the top cover is at a closed position.

When the rod 33 is disposed at the evacuation position, as shown in FIG. 5, the end portion of the rod 33 on the one side in the longitudinal direction is disposed in the large-diameter end portion 34 of the cylinder 32.

In this case, as shown in FIG. 8A, the buffering portion 61 of the slide member 30 faces the large-diameter end portion 34 of the cylinder 32 with a gap in the radial direction. In other words, when the rod 33 is disposed at the evacuation position, the large-diameter end portion 34 receives the slide member 30 with a play.

When the rod 33 is placed at the advance position, as shown in FIG. 4A, the end portion of the rod 33 on the one side in the longitudinal direction is disposed in the end portion of the main cylinder body 35 of the cylinder 32 on the other side in the longitudinal direction.

In this case, the radially outer circumferential surface of the end portion of the buffering portion 61 of the slide member 30 on the other side in the longitudinal direction is in contact with the inner circumferential surface of the main cylinder body 35 of the cylinder 32. In other words, the end portion of the buffering portion 61 of the slide member 30 on the other side in the longitudinal direction acts as a protruding portion 64.

Also, in this case, the locking claws 53 of the rod 33 face the locking portions 45 of the stoppers 42 of the cylinder 32 from the other side in the longitudinal direction. Therefore, the movement of the rod 33 from the advance position to the evacuation position is regulated.

Further, as shown in FIG. 4B, the brim portion 54 of the rod 33 faces the retaining protrusions 44 of the cylinder 32 from the one side in the longitudinal direction. Therefore, the further movement of the rod 33 toward the other side in the longitudinal direction is regulated.

The supporting bosses 38 of the cylinder 32 are fit into supporting-boss fitting holes 27 of the main body casing 2 so as to be relatively rotatable, whereby the dampers 31 are rotatably connected to the main body casing 2.

Also, the rotary shafts 52 of the rod 33 are rotatably connected to the bottom of the top cover 4, whereby the dampers 31 are rotatably connected to the substantially central portion of the top cover 4 in the front/rear direction.

In this way, the dampers 31 are connected to the main body casing 2 and the top cover 4.

5. Opening/Closing Operation of Top Cover

When the top cover 4 is disposed at the closed position, as shown in FIG. 5, the fit protrusions 22 of the top cover 4 are fit into the fitting recesses 24 of the main body casing 2. In other words, the fitting recesses 24 position the top cover 4 at the closed position.

Also, the dampers 31 are disposed along the front/rear direction such that the end portions of the dampers 31 on the one side in the longitudinal direction are disposed on the rear side. Further, the rod 33 is disposed at the evacuation position.

In order to move the top cover 4 from the closed position to the open position, the front end portion of the top cover 4 is grasped and is pressed upward.

Then, the fit protrusions 22 of the top cover 4 are separated upward from the fitting recesses 24 of the main body casing 2.

Also, the dampers 31 rotate upward on the supporting bosses 38 of the cylinder 32.

In this case, the rod 33 is pulled toward the top front side by the top cover 4, thereby moving from the evacuation position to the advance position. Therefore, the dampers 31 stretch toward the top front side according to the advance distance of the rod 33 from the cylinder 32.

Then, the protruding portion 64 of the slide member 30 abuts on the connecting portion 36 of the cylinder 32 from the lower rear side.

Thereafter, when the top cover 4 is pressed further upward, the dampers 31 rotate further upward on the supporting bosses 38 of the cylinder 32.

Then, the rod 33 further stretches toward the top front side by the top cover 4, thereby moving from the evacuation position to the advance position.

Therefore, the protruding portion 64 of the slide member 30 moves into the main cylinder body 35 while being compressed toward the inner side in the radial direction according to the inclination of the connecting portion 36 of the cylinder 32.

Figure 8B:
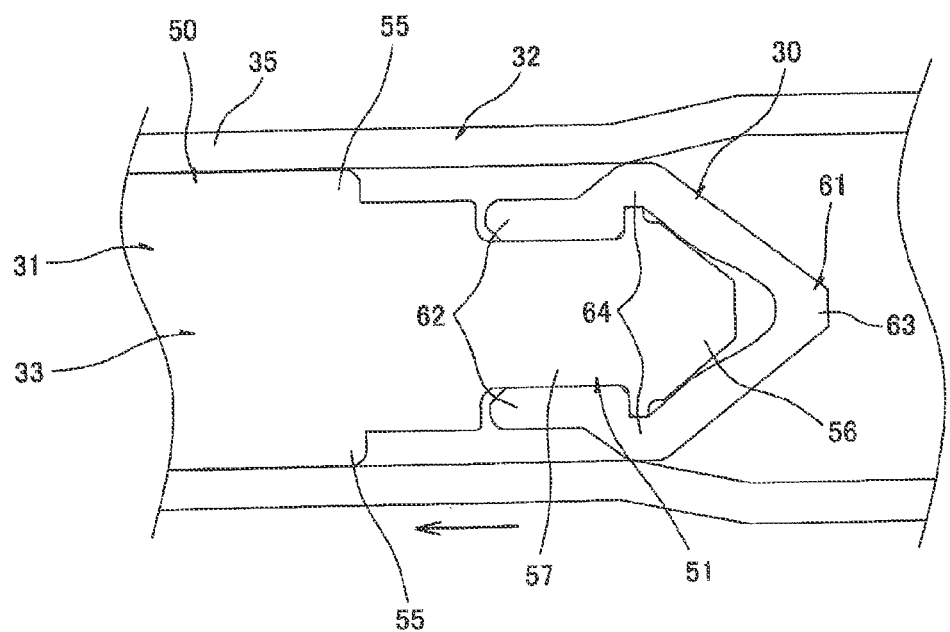

In this case, as shown in FIG. 8B, the protruding portion 64 of the slide member 30 is pressed toward the opposite side to the advance direction of the rod 33 (e.g., the top front side in FIG. 6) by the friction with the inner circumferential surface of the cylinder 32.

Figure 6:
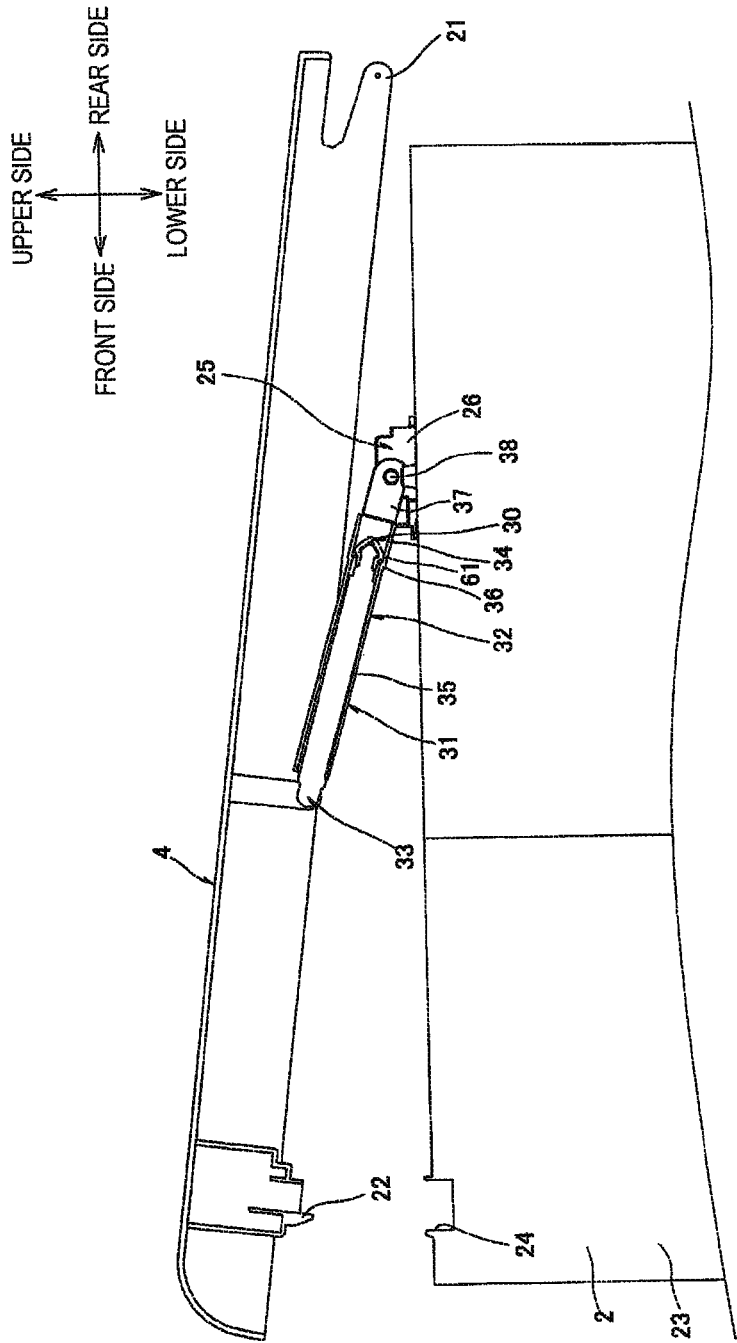
FIG. 6 is an explanatory view for explaining the opening/closing operation of the top cover shown in FIG. 2, and shows a state where a slide member and a connecting portion of the cylinder abut on each other in a progress where the top cover is opening or closing.

Therefore, the protruding portion 64 of the slide member 30 moves to evacuate from the inner circumferential surface of the cylinder 32 into the gap G, and the slide member 30 is deformed such that the covering portion 63 extends toward the one side in the longitudinal direction (e.g., the lower rear side in FIG. 6).

As a result, the pressure of the protruding portion 64 of the slide member 30 on the inner circumferential surface of the cylinder 32 is reduced, and a frictional force between the protruding portion 64 of the slide member 30 and the inner circumferential surface of the cylinder 32 is reduced.

Then, when the top cover 4 is pressed further upward, as shown in FIG. 7, the dampers 31 rotate further upward on the supporting bosses 38 of the cylinder 32, so as to rise in the vertical direction.

In this case, the locking claws 53 of the rod 33 about on the locking portions 45 of the stoppers 42 from the one side in the longitudinal direction (e.g., the lower side in FIG. 7), and pass the stoppers 42 toward the other side in the longitudinal direction (e.g., the upper side in FIG. 7) while bending the stoppers 42 outward in the radial direction (see FIG. 4A).

Further, when the rod 33 is disposed at the advance position, stoppers 42 are restored, and the locking claws 53 of the rod 33 face the locking portions 45 of the stoppers 42 of the cylinder 32 from the upper side as described above. Therefore, the movement of the rod 33 from the upper side to the lower side is regulated, such that the top cover 4 is held at the open position.

On the other hand, in order to move the top cover 4 from the open position to the closed position, the front end portion of the top cover 4 is grasped and is pressed downward.

Then, the locking claws 53 of the rod 33 passes the locking portions 45 of the stoppers 42 toward the one side in the longitudinal direction (the lower side in FIG. 7) while bending the stoppers 42 toward the outer side in the radial direction (see FIG. 4A). Therefore, the regulation of the movement of the rod 33 from the upper side to the lower side is released.

Next, when the top cover 4 is pressed further downward, the rod 33 evacuates into the cylinder 32, and the dampers 31 rotate toward the lower front side at the same time.

Figure 8C:
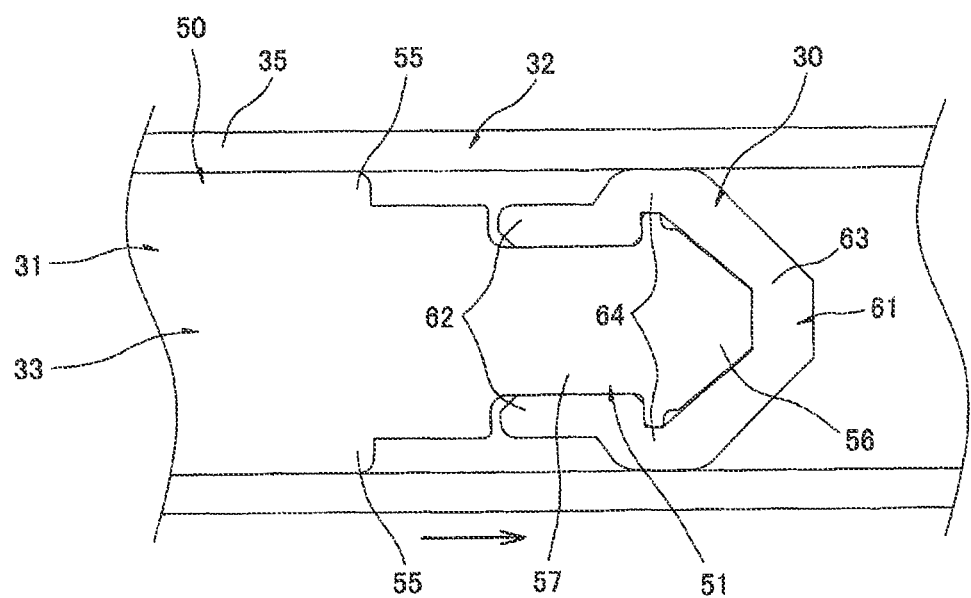

In this case, as shown in FIG. 8C, the protruding portion 64 of the slide member 30 is pressed toward the opposite side (e.g., the top front side in FIG. 7) to the evacuation direction of the rod 33 (e.g., the lower rear side in FIG. 7) by the friction with the inner circumferential surface of the main cylinder body 35 of the cylinder 32.

Therefore, the covering portion 63 of the slide member 30 moves to head to the gap G, and the slide member 30 is deformed such that the protruding portion 64 is pressed against the inner circumferential surface of the main cylinder body 35 of the cylinder 32.

In this case, the pressure of the protruding portion 64 of the slide member 30 on the inner circumferential surface of the cylinder 32 increases, and the frictional force between the protruding portion 64 of the slide member 30 and the inner circumferential surface of the cylinder 32 increases.

That is, the slide member 30 is deformed such that the pressure on the cylinder 32 when the top cover 4 rotates from the open position to the closed position is larger than the pressure on the cylinder 32 when the top cover 4 rotates from the closed position to the open position.

In other words, the slide member 30 is deformed such that the frictional force with the cylinder 32 when the top cover 4 rotates from the open position to the closed position is larger than the frictional force with the cylinder 32 when the top cover 4 moves from the closed position to the open position.

Then, the rotation of the top cover 4 from the open position to the closed position is braked by the frictional force between the protruding portion 64 of the slide member 30 and the inner circumferential surface of the cylinder 32.

Thereafter, when the top cover 4 is pressed further downward, as shown in FIG. 6, immediately before the top cover 4 is disposed at the closed position, the buffering portion 61 of the slide member 30 is received by the large-diameter end portion 34 of the cylinder 32.

Therefore, the contact of the slide member 30 with the inner circumferential surface of the cylinder 32 is released, such that the braking of the rotation of the top cover 4 is released.

As described above, immediately before the top cover 4 is disposed at the closed position, the rotation of the top cover 4 is braked by the dampers 31. Therefore, an impact attributable to the rotation of the top cover 4 is buffered.

6. Advantages (1) According to the printer 1, as shown in FIG. 8C, when the top cover 4 rotates from the open position to the closed position, it is possible to certainly bring the protruding portion 64 of the slide member 30 into pressure contact with the inner circumferential surface of the cylinder 32.

Accordingly, when the top cover 4 rotates from the open position to the closed position, it is possible to certainly increase the frictional force between the slide member 30 and the cylinder 32.

Therefore, when the top cover 4 rotates from the open position to the closed position, it is possible to use the frictional force between the protruding portion 64 of the slide member 30 and the inner circumferential surface of the cylinder 32 to brake the rotation of the top cover 4 and buffer an impact attributable to the rotation of the top cover 4.

Further, as shown in FIGS. 5 and 8A, when the top cover 4 is disposed at the closed position, since a frictional force is not generated between the slide member 30 and the cylinder 32, it is possible to reduce a force on the main body casing 2 from the dampers 31.

As a result, it is possible to reduce the load on the main body casing 2 from the dampers 31 while buffering an impact attributable to the rotation of the top cover 4 by the dampers 31.

(2) According to the printer 1, as shown in FIGS. 8B and 8C, it is possible to use the friction with the inner circumferential surface of the cylinder 32 to deform the slide member 30.

Therefore, it is possible to deform the slide member 30 with the simple configuration without providing an additional member for deforming the slide member 30.

(3) According to the printer 1, as shown in FIGS. 5 and 7, the position of the front end portion of the top cover 4 at the closed position is lower than the position of the front end portion of the top cover 4 at the open position.

Therefore, when the top cover 4 rotates such that the front end portion heads to the lower side, it is possible to brake the rotation of the top cover 4.

(4) According to the printer 1, as shown in FIGS. 5 and 7, when the top cover 4 moves from the open position to the closed position, it is possible to evacuate the rod 33 into the cylinder 32, and when the top cover 4 moves from the closed position to the open position, it is possible to advance the rod 33 from the cylinder 32.

Therefore, the top cover 4 can be positioned at the open position so as to be distant from the apparatus main body, and can be positioned at the closed position so as to be adjacent to the apparatus main body.

(5) According to the printer 1, as shown in FIG. 8B, when the top cover 4 rotates from the closed position to the open position, the slide member 30 is deformed such that the protruding portion 64 moves into the gap G.

Therefore, when the top cover 4 rotates from the closed position to the open position, it is possible to evacuate the protruding portion 64 from the inner circumferential surface of the cylinder 32 into the gap G.

For this reason, when the top cover 4 rotates from the closed position to the open position, it is possible to reduce the frictional force between the slide member 30 and the cylinder 32.

As a result, it is possible to easily rotate the top cover 4 from the closed position to the open position.

(6) According to the printer 1, as shown in FIG. 8A, the gap G is formed upstream of the protruding portion 64 in the movement direction of the rod 33 when the top cover 4 rotates from the closed position to the open position (that is, on the one side in the longitudinal direction).

Therefore, it is possible to use the friction with the inner circumferential surface of the cylinder 32, caused by the rotation of the top cover 4 from the closed position to the open position, to move the protruding portion 64 toward the gap G.

As a result, when the top cover 4 rotates from the closed position to the open position, it is possible to certainly reduce the frictional force between the protruding portion 64 of the slide member 30 and the inner circumferential surface of the cylinder 32 with the simple configuration.

(7) According to the printer 1, as shown in FIG. 8A, it is possible to cover the end portion of the rod 33 on the downstream side in the evacuation direction into the cylinder 32 (that is, the end portion on the one side in the longitudinal direction) by the buffering portion 61.

Therefore, as shown in FIG. 8C, when the rod 33 evacuates into the cylinder 32, it is possible to use the buffering portion 61 to prevent the slide member 30 from shifting toward the other side in the longitudinal direction.

(8) According to the printer 1, as shown in FIG. 8A, the gap G is formed between the buffering portion 61 and the rod 33.

Therefore, when the rod 33 evacuates into the cylinder 32, it is possible to deform the slide member 30 such that the buffering portion 61 is displaced close to the rod 33 by the simple configuration.

(9) According to the printer 1, as shown in FIGS. 8B and 8C, it is possible to use the end portion of the rod main body 50 on the one side in the longitudinal direction and the end portion of the front end portion 56 of the slide-member supporting portion 51 on the other side in the longitudinal direction to prevent the slide member 30 from shifting according to the movement of the rod 33.

(10) According to the printer 1, as shown in FIG. 4A, it is possible to hold the rod 33 at the evacuation position by the engagement of the locking claws 53 and the stoppers 42.

(11) According to the printer 1, as shown in FIG. 4B, it is possible to use the engagement of the brim portion 54 and the retaining protrusions 44 to prevent the rod 33 from deviating in the advance direction from the cylinder 32.

(12) According to the printer 1, as shown in FIG. 4C, it is possible to use the engagement of the rails 55 and the rail fitting grooves 43 to prevent the rod 33 from rotating with respect to the cylinder 32.

(13) According to the printer 1, as shown in FIGS. 5 and 6, the slide member 30 is received by the large-diameter end portion 34 before the top cover 4 is disposed at the closed position.

Therefore, before the top cover 4 is disposed at the closed position, it is possible to release the friction of the rod 33 with the cylinder 32.

As a result, when the top cover 4 is disposed at the closed position, it is possible to reduce the force on the main body casing 2 from the dampers 31.

(14) According to the printer 1, as shown in FIG. 8B, when the rod 33 advances from the cylinder 32, it is possible to gradually (e.g., slowly) deform the slide member 30 according to the inclination of the connecting portion 36.

Therefore, it is possible to smoothly deform the slide member 30.

(15) According to the printer 1, as shown in FIGS. 5 and 7, the top cover 4 opens the main body opening 5 at the open position, and the top cover 4 closes the main body opening 5 at the closed position.

Therefore, when the top cover 4 closes the main body opening 5, it is possible to buffer an impact attributable to the rotation of the top cover 4.

(16) According to the printer 1, in a configuration in which the LED units 12 are supported by the top cover 4 as shown in FIG. 2 and the weight of the top cover 4 increases by the LED units 12, it is possible to buffer an impact attributable to the rotation of the top cover 4.

7. Modifications to Exemplary Embodiments (1) First Modification

In the above-described exemplary embodiment, the covering portion 63 for covering the front end portion 56 of the rod 33 is provided to the slide member 30, and the gap G is formed between the covering portion 63 and the front end portion 56 of the rod 33.

Figure 9A:
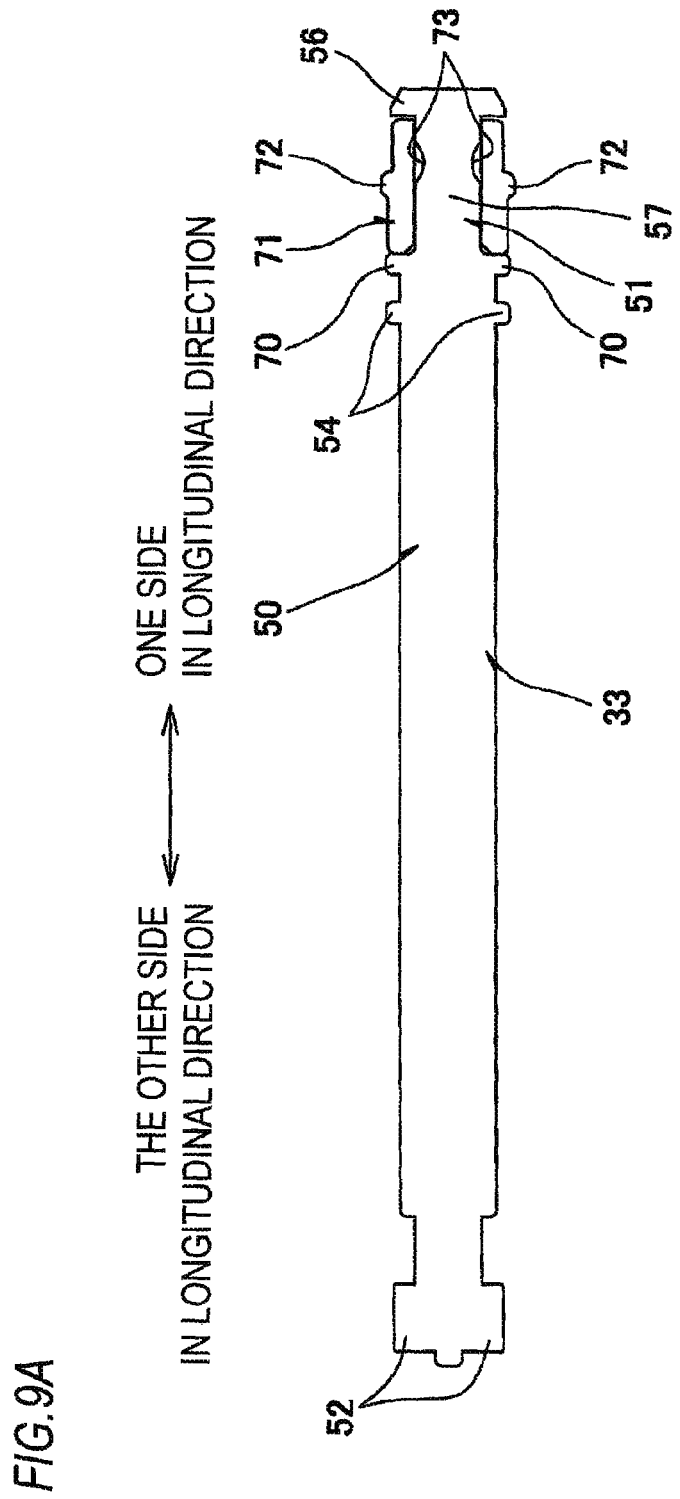

On the other hand, in a first modification, as shown in FIG. 9A, the covering portion 63 is not provided to a slide member 71, but the outer circumferential surface of the base end portion 57 of the slide-member supporting portion 51 is dented inward in the radial direction, whereby a rod-side recess 73 (one example of a first recess) is formed.

Specifically, the slide member 71 is formed in a substantially cylindrical shape extending in the longitudinal direction. The slide member 71 covers the slide-member supporting portion 51 so as to come into contact with the outer circumferential surface of the base end portion 57 of the slide-member supporting portion 51. The slide member 71 includes a protruding portion 72.

The protruding portion 72 is provided nearly at the center of the slide member 71 in the longitudinal direction. The protruding portion 72 is formed as a ridge protruding from the outer surface of the slide member 71 in the radial direction outward in the radial direction and extending in the circumferential direction of the slide member 71. The outside diameter of the protruding portion 72 is slightly larger than the inside diameter of the main cylinder body 35 of the cylinder 32.

The rod-side recess 73 is formed as a concave groove extending from the outer circumferential surface of the base end portion 57 of the slide-member supporting portion 51 inward in the radial direction, such that the rod-side recess 73 is separated from the inner circumferential surface of the slide member 71 on one side of the protruding portion 72 in the longitudinal direction. The end portion of the rod-side recess 73 on the other side in the longitudinal direction overlaps the end portion of the protruding portion 72 on the one side in the longitudinal direction when being projected in the radial direction.

A regulating portion 70 is provided at the end portion of the rod main body 50 on the one side in the longitudinal direction.

The regulating portion 70 is formed as a ridge protruding from the outer circumferential surface of the rod main body 50 outward in the radial direction and extending in the circumferential direction of the rod main body 50. The outside diameter of the regulating portion 70 is the same as the outside diameter of the brim portion 54.

When the rod 33 moves from the evacuation position toward the advance position, the slide member 71 is deformed such that the protruding portion 72 moves into the rod-side recess 73.

According to the first modification, it is possible to use the rod-side recess 73 of the rod 33 to deform the slide member 71 by the simple configuration.

Even in the first modification, it is possible to achieve the same effects as those of the above-described exemplary embodiment.

(2) Second Modification

In the above-described first modification, the outer circumferential surface of the base end portion 57 of the slide-member supporting portion 51 is dented inward in the radial direction, whereby the rod-side recess 73 is formed.

On the other hand, in a second modification, as shown in FIG. 9B, the slide member 71 is provided with a slide-member-side recess 74 (one example of a second recess) extending outward in the radial direction.

The slide-member-side recess 74 is formed as a concave groove extending from the inner circumferential surface of the slide member 71 outward in the radial direction so as to be separated from the outer circumferential surface of the slide-member supporting portion 51 of the rod 33 at one side of the protruding portion 72 in the longitudinal direction. The end portion of the slide-member-side recess 74 on the other side in the longitudinal direction overlaps the end portion of the protruding portion 72 on the one side in the longitudinal direction when being projected in the radial direction.

When the rod 33 moves from the evacuation position toward the advance position, the slide member 71 is deformed such that the protruding portion 72 presses the slide-member-side recess 74 toward the inner side in the radial direction.

According to the second modification, it is possible to use the slide-member-side recess 74 of the slide member 71 to deform the slide member 71 by the simple configuration.

Even in the second modification, it is possible to achieve the same effects as those of the above-described exemplary embodiment.

(3) Third Modification

In the above-described exemplary embodiment, the connecting portion 36 is formed to narrow in the radial direction as from the one side to the other side in the longitudinal direction.

Figure 10:
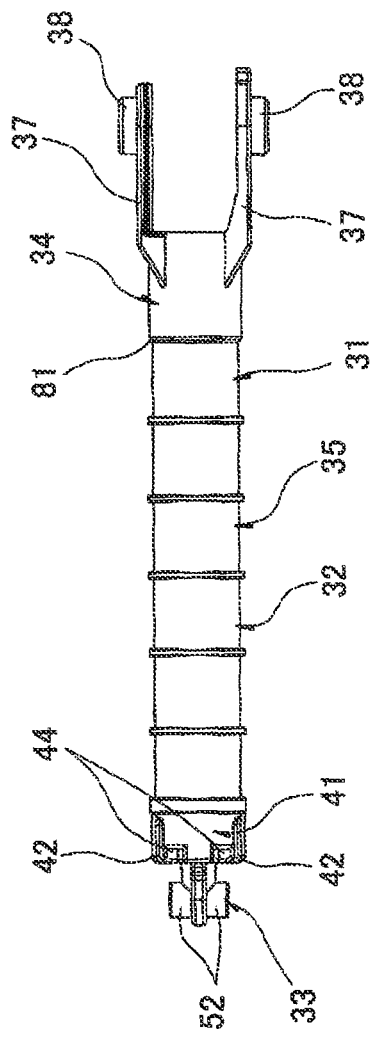
FIG. 10 is an explanatory view for explaining a third modification example of the damper.

On the other hand, in a third modification, as shown in FIG. 10, a connecting portion 81 is formed to extend from the end portion of the large-diameter end portion 34 on the other side in the longitudinal direction to the end portion of the main cylinder body 35 on the one side in the longitudinal direction, along the radial direction.

According to the third modification, when the rod 33 advances from the cylinder 32, at the timing when the slide member 30 passes through the connecting portion 81, it is possible to deform the slide member 30.

Therefore, it is possible to quickly deform the slide member 30.

(4) Fourth Modification

Figure 11:
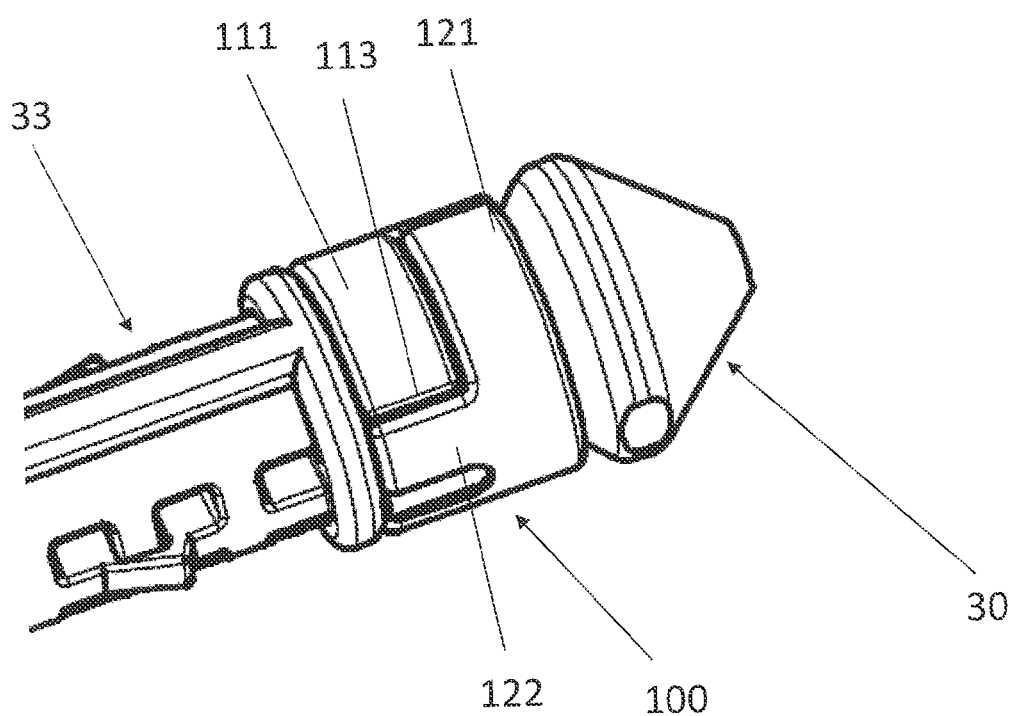
FIG. 11 is an enlarged explanatory view for explaining a fourth modification example of the damper.
Figure 13:
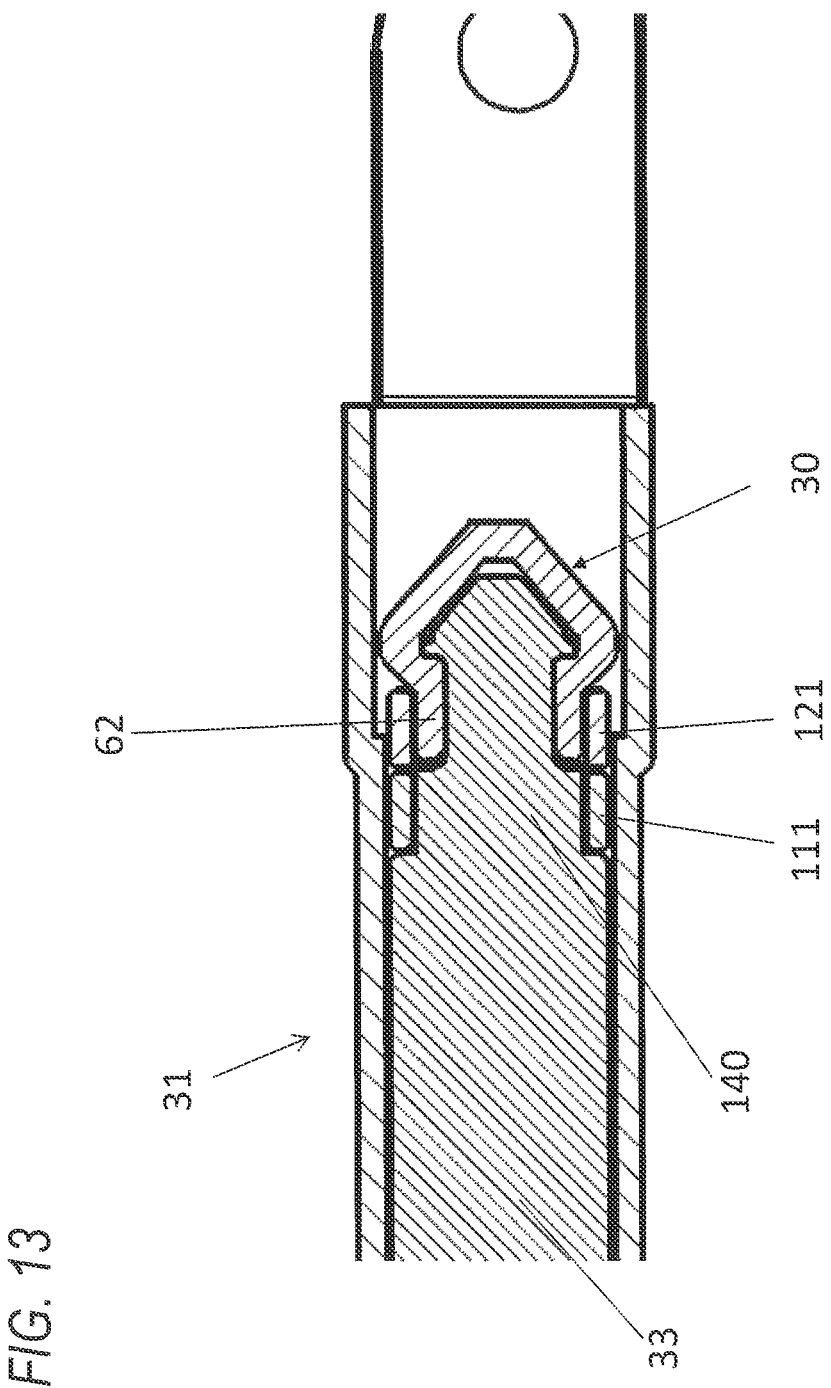
FIG. 13 is an enlarged perspective view of the damper according to the fourth modification.

In a fourth modification, as shown in FIGS. 11 and 13, the damper 31 is provided with a cap 100 (one example of a holding member) configured to cover an outer circumference of the fitting portion 62 of the slide member 30.

Figure 12:
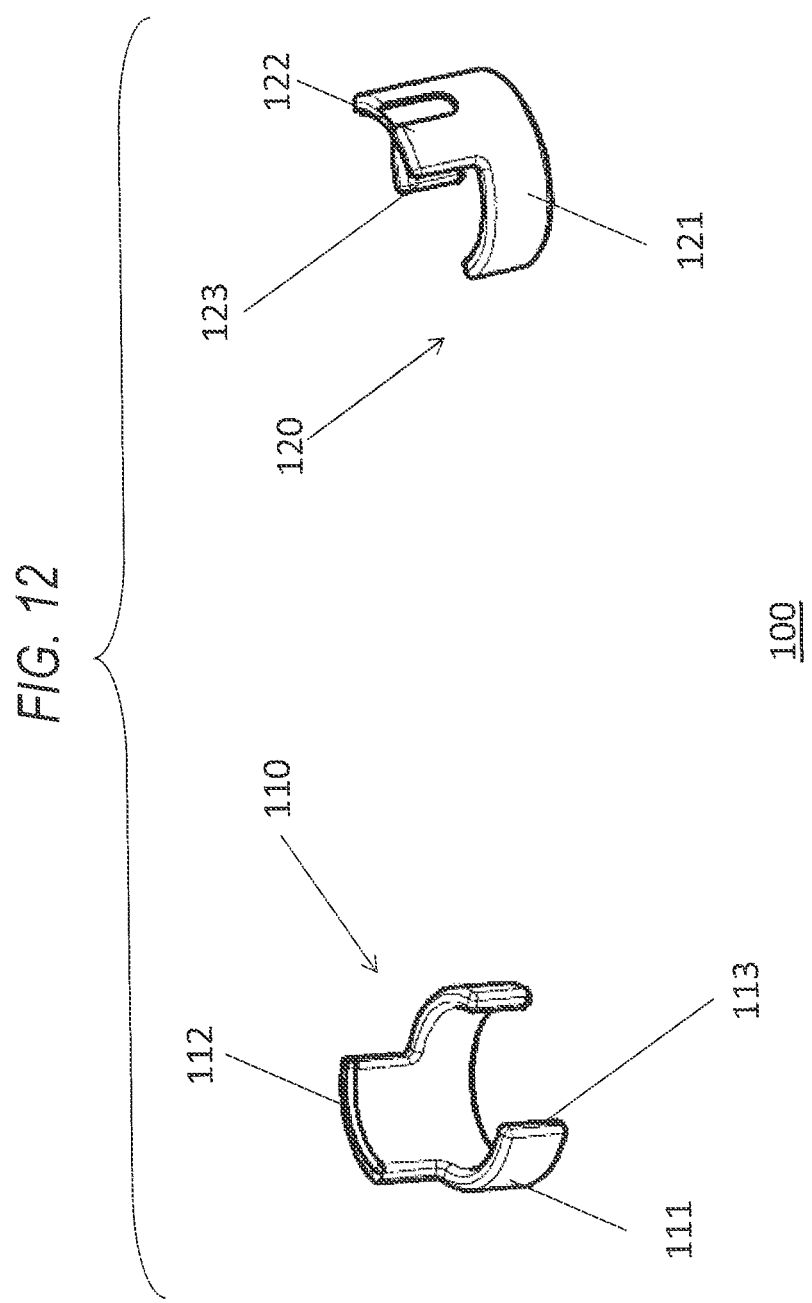
FIG. 12 shows a cap according to the fourth modification.

As shown in FIGS. 11 and 12, the cap 100 includes a first cap member 110 and a second cap member 120. The first cap member 110 is made of resin. The first cap member 110 includes a first arc portion 111 having a substantially C shape, a first protruding portion 112 protruding from the first arc portion 111, and a first cutout portion 113. The second cap member 120 includes a second arc portion 121 having a substantially C shape, a second protruding portion 122 protruding from the second arc portion 121, and a second cutout portion 123.

The first cap member 110 is fitted to a small-diameter portion 140 of the rod 33 by extending a gap between end portions of the first cutout portion 113, whereby the first arc portion 111 is fixed to the rod 33 such that the first arc portion 111 covers a part of the outer circumference of the small-diameter portion 140. In this state, the first protruding portion 112 is disposed to cover a part of the outer circumference of the fitting portion 62.

The second cap member 120 is fitted to the fitting portion 62 by extending a gap between end portions of the second cutout portion 123, whereby the second arc portion 121 is fixed to the slide member 30 such that the second arc portion 121 covers a part of the outer circumference of the fitting portion 62. In this state, the first protruding portion 112 is provided in the gap between end portions of the second cutout portion 123, and the second protruding portion 122 is provided in the gap between end portions of the first cutout portion 113.

According thereto, the outer circumference of the fitting portion 62 is covered by the cap 100. Therefore, it is possible to prevent the fitting portion 62 from being peeled off due to the movement of the rod 33.

(5) Other Modifications

In the above-described exemplary embodiment, the dampers 31 are provided between the top cover 4 and the main body casing 2. However, for example, it is possible to provide a front cover, as an example of the slide member swingable on a lower end portion thereof, to the front end portion of the main body casing 2, and to provide the dampers 31 between the front cover and the main body casing 2. In this case, the dampers 31 may be provided to brake the opening operation of the front cover.

What is claimed is:

1. An image forming apparatus comprising:
an apparatus main body;
a rotary member configured to rotate with respect to the apparatus main body between a first position and a second position that is different from the first position; and
a buffering member, which is connected to the apparatus main body and the rotary member, and which is configured to buffer an impact attributable to rotation of the rotary member,
wherein the buffering member comprises:
a hollow member connected to any one of the apparatus main body and the rotary member;
a movable member having an end portion, the end portion comprising a tapered portion where a diameter of the movable member decreases, the movable member being connected to any one of the apparatus main body and the rotary member, and configured to move between an evacuation position where the movable member evacuates into the hollow member and an advance position where the movable member advances from the hollow member; and
a slide member, which is provided to cover at least the tapered portion of the movable member, and which is configured to contact an inner circumferential surface of the hollow member, and
wherein the slide member is configured to be deformed such that a first pressure on the hollow member when the rotary member rotates from the first position to the second position is larger than a second pressure on the hollow member when the rotary member rotates from the second position to the first position.

2. The image forming apparatus according to claim 1, wherein the slide member is configured to be elastically deformed by friction with the inner circumferential surface of the hollow member.

3. The image forming apparatus according to claim 1, wherein, in a vertical direction, the position of a rotation end portion of the rotary member at the second position is lower than the position of the rotation end portion of the rotary member at the first position.

4. The image forming apparatus according to claim 1,
wherein the movable member is disposed at the advance position when the rotary member is disposed at the first position, and
wherein the movable member is disposed at the evacuation position when the rotary member is disposed at the second position.

5. The image forming apparatus according to claim 1,
wherein the slide member comprises:
a covering portion configured to cover the movable member to form a gap from the movable member; and
a protruding portion, which protrudes from the covering portion toward the inner circumferential surface of the hollow member, and which is configured to contact the inner circumferential surface of the hollow member, and
wherein the slide member is configured to be deformed such that the protruding portion moves into the gap when the rotary member rotates from the second position to the first position.

6. The image forming apparatus according to claim 5, wherein the gap is formed upstream of the protruding portion in a movement direction of the movable member when the rotary member rotates from the second position to the first position.

7. The image forming apparatus according to claim 5,
wherein a first end portion of the movable member is connected to any one of the apparatus main body and the rotary member, and a second end portion of the movable member is disposed in the hollow member, and
wherein the slide member comprises an end-portion covering portion configured to cover the second end portion of the movable member.

8. The image forming apparatus according to claim 7, wherein the gap is formed between the end-portion covering portion and the movable member.

9. The image forming apparatus according to claim 5,
wherein the slide member covers the movable member such that the slide member is contactable with the movable member,
wherein the movable member comprises a first recess formed to be separated from the slide member, and
wherein the gap is formed between the slide member and the first recess.

10. The image forming apparatus according to claim 5,
wherein the slide member covers the movable member such that the slide member is contactable with the movable member,
wherein the slide member comprises a second recess formed to be separated from the movable member, and
wherein the gap is formed between the movable member and the second recess.

11. The image forming apparatus according to claim 1, wherein the movable member comprises a regulating portion that protrudes toward the hollow member and is configured to regulate movement of the slide member in a movement direction of the movable member.

12. The image forming apparatus according to claim 1,
wherein the movable member comprises a first engagement portion, and
wherein the hollow member comprises a first engagement subject portion configured to be engaged with the first engagement portion and to regulate movement of the movable member from the advance position to the evacuation position when the movable member is disposed at the evacuation position.

13. The image forming apparatus according to claim 12,
wherein the movable member further comprises:
a second engagement portion; and
a third engagement portion, and
wherein the hollow member further comprises:
a second engagement subject portion configured to be engaged with the second engagement portion and regulate further movement of the movable member in an advance direction when the movable member is disposed at the advance position, and
a third engagement subject portion configured to be engaged with the third engagement portion and regulate rotation of the movable member relative to the hollow member in a direction perpendicular to a movement direction of the movable member.

14. The image forming apparatus according to claim 1,
wherein the movable member comprises a second engagement portion,
wherein the hollow member comprises a second engagement subject portion configured to be engaged with the second engagement portion and regulate further movement of the movable member in an advance direction when the movable member is disposed at the advance position.

15. The image forming apparatus according to claim 1,
wherein the movable member comprises a third engagement portion, and
wherein the hollow member comprises a third engagement subject portion configured to be engaged with the third engagement portion and regulate rotation of the movable member relative to the hollow member in a direction perpendicular to a movement direction of the movable member.

16. The image forming apparatus according to claim 1,
wherein the hollow member comprises:
a first portion configured to receive the slide member with play when the movable member is disposed at the evacuation position; and
a second portion, which is configured to contact the slide member when the movable member advances, and which is narrower than the first portion in an orthogonal direction perpendicular to an advance direction of the movable member,
wherein the apparatus main body comprises a positioning portion configured to position the rotary member at the second position, and
wherein the slide member is configured to be received by the first portion before the rotary member is disposed at the second position.

17. The image forming apparatus according to claim 16, wherein the hollow member comprises a connecting portion, which is inclined to narrow in the orthogonal direction from an upstream side to a downstream side in the advance direction of the movable member, and which connects an end portion of the first portion on the downstream side in the advance direction and an end portion of the second portion on the upstream side in the advance direction.

18. The image forming apparatus according to claim 16, wherein the hollow member comprises a connecting portion that extends from an end portion of the first portion on a downstream side in the advance direction toward an end portion of the second portion on an upstream side in the advance direction, along the orthogonal direction.

19. The image forming apparatus according to claim 1, wherein the apparatus main body comprises an opening configured to communicate between an inside and an outside of the apparatus main body, and
wherein the rotary member is configured to:
open the opening when the rotary member is at the first position; and
close the opening when the rotary member is at the second position.

20. The image forming apparatus according to claim 19, further comprising:
a photosensitive member configured to be provided in the apparatus main body; and
an exposing member, which is disposed to face the photosensitive member, and which is configured to expose the photosensitive member,
wherein the exposing member is supported by the rotary member.

21. The image forming apparatus according to claim 1, wherein the buffering member comprises a holding member configured to hold the slide member to the movable member,
wherein the movable member has a substantially cylindrical shape extending in a movement direction of the movable member,
wherein the slide member is configured to cover an outer circumferential surface of the movable member, and
wherein the holding member is configured to sandwich at least a part of the slide member between the holding member and the outer circumference of the movable member so as to hold the slide member to the movable member.

22. An image forming apparatus comprising:
an apparatus main body;
a cover configured to rotate with respect to the apparatus main body between a first position and a second position that is different from the first position; and
a damper, which is connected to the apparatus main body and the cover, and which comprises:
a cylinder connected to the apparatus main body;
a rod, an end portion of which comprises a tapered portion where a diameter of the rod decreases, and which is configured to move between: an evacuation position where the rod evacuates into the cylinder when the cover is disposed at the second position; and an advance position where the rod advances from the cylinder when the cover rotates from the second position to the first position; and
a slide member comprising a protruding portion protruding toward the cylinder, wherein the slide member is configured to cover at least the tapered portion of the rod and is configured to contact an inner circumferential surface of the cylinder,
wherein the slide member is configured to form a gap from the tapered portion of the rod at a downstream side of the protruding portion in a movement direction of the rod when the cover rotates from the second position to the first position.

* * * * *